(12) United States Patent
Hu et al.

(10) Patent No.: US 9,791,110 B2
(45) Date of Patent: Oct. 17, 2017

(54) HIGH EFFICIENCY DRIVER CIRCUIT WITH FAST RESPONSE

(71) Applicant: Cree, Inc., Durham, NC (US)

(72) Inventors: Yuequan Hu, Morrisvile, NC (US);
Daniel Pope, Morrisville, NC (US);
Qingcong Hu, Morrisville, NC (US)

(73) Assignee: Cree, Inc., Durham, NC (US)

( * ) Notice: Subject to any disclaimer, the term of this patent is extended or adjusted under 35 U.S.C. 154(b) by 69 days.

(21) Appl. No.: 14/291,829

(22) Filed: May 30, 2014

(65) Prior Publication Data

US 2015/0312983 A1    Oct. 29, 2015

Related U.S. Application Data

(60) Provisional application No. 61/984,467, filed on Apr. 25, 2014.

(51) Int. Cl.
*F21K 99/00* (2016.01)
*F21V 29/503* (2015.01)
(Continued)

(52) U.S. Cl.
CPC ............... *F21K 9/1355* (2013.01); *F21K 9/23* (2016.08); *F21V 3/00* (2013.01); *F21V 7/0066* (2013.01);
(Continued)

(58) Field of Classification Search
CPC .. H02M 3/156; H02M 3/33561; F21S 48/325; H05B 33/0815
(Continued)

(56) References Cited

U.S. PATENT DOCUMENTS 3,581,162 A    5/1971    Wheatley
4,675,797 A    6/1987    Vinciarelli
(Continued)

FOREIGN PATENT DOCUMENTS

EP    1058221 A2    12/2000
EP    0890059 B1    6/2004
(Continued)

OTHER PUBLICATIONS

Cree, Inc. , U.S. Appl. No. 14/284,781, filed May 22, 2014, 50 pages.
(Continued)

*Primary Examiner* — Douglas W Owens
*Assistant Examiner* — Wei Chan
(74) *Attorney, Agent, or Firm* — Dennis J. Williamson; Moore & Van Allen PLLC

(57) ABSTRACT

A high efficiency driver circuit with fast response is disclosed. Embodiments of the present invention relate to an LED driver that can drive a plural number of LED strings. The driver according to example embodiments includes a voltage converter stage with a feedback loop. The driver can include a speed-up circuit, and/or an adaptive output voltage control circuit, also referred to herein as an overhead control circuit. In at least some embodiments, an input inductor helps to attenuate input current ripple, which could otherwise lead to low high-frequency winding loss in other inductors. The speed-up circuit can provide current regulation of the LED strings and prevent flickering of the LEDs. The overhead control circuit can adjust the output voltage of the driver to an optimum value to improve operating efficiency.

15 Claims, 19 Drawing Sheets

(51) Int. Cl.

| | | |
|---|---|---|
| *F21V 23/00* | (2015.01) | |
| *F21V 23/06* | (2006.01) | |
| *F21V 7/00* | (2006.01) | |
| *F21V 3/00* | (2015.01) | |
| *H01R 43/00* | (2006.01) | |
| *H05B 33/08* | (2006.01) | |
| *F21V 17/02* | (2006.01) | |
| *F21K 9/23* | (2016.01) | |
| *F21W 131/10* | (2006.01) | |
| *F21S 8/08* | (2006.01) | |
| *F21V 14/04* | (2006.01) | |
| *F21V 29/77* | (2015.01) | |
| *F21Y 101/00* | (2016.01) | |
| *F21Y 115/10* | (2016.01) | |
| *F21Y 107/30* | (2016.01) | |

(52) U.S. Cl.
CPC .............. *F21V 17/02* (2013.01); *F21V 23/007* (2013.01); *F21V 23/06* (2013.01); *F21V 29/503* (2015.01); *H01R 43/00* (2013.01); *H05B 33/08* (2013.01); *H05B 33/089* (2013.01); *H05B 33/0815* (2013.01); *H05B 33/0827* (2013.01); *H05B 33/0848* (2013.01); *F21S 8/088* (2013.01); *F21V 14/04* (2013.01); *F21V 29/773* (2015.01); *F21W 2131/10* (2013.01); *F21Y 2101/00* (2013.01); *F21Y 2107/30* (2016.08); *F21Y 2115/10* (2016.08); *Y02B 20/341* (2013.01); *Y02B 20/347* (2013.01)

(58) Field of Classification Search
USPC ............... 315/291, 297, 294, 224, 186, 122; 327/536
See application file for complete search history.

(56) References Cited

U.S. PATENT DOCUMENTS

| | | | |
|---|---|---|---|
| 5,463,280 A | 10/1995 | Johnson | |
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,550,953 B1 | 4/2003 | Ichikawa et al. | |
| 6,634,770 B2 | 10/2003 | Cao | |
| 6,659,632 B2 | 12/2003 | Chen | |
| 6,709,132 B2 | 3/2004 | Ishibashi | |
| 6,803,607 B1 | 10/2004 | Chan et al. | |
| 6,848,819 B1 | 2/2005 | Arndt et al. | |
| 6,864,513 B2 | 3/2005 | Lin et al. | |
| 6,948,829 B2 | 9/2005 | Verdes et al. | |
| 6,982,518 B2 | 1/2006 | Chou et al. | |
| 7,034,607 B2 * | 4/2006 | Otake .................. | H02M 3/156 315/308 |
| 7,048,412 B2 | 5/2006 | Martin et al. | |
| 7,080,924 B2 | 7/2006 | Tseng et al. | |
| 7,086,756 B2 | 8/2006 | Maxik | |
| 7,086,767 B2 | 8/2006 | Sidwell et al. | |
| 7,144,135 B2 | 12/2006 | Martin et al. | |
| 7,165,866 B2 | 1/2007 | Li | |
| 7,172,314 B2 | 2/2007 | Currie et al. | |
| 7,291,992 B2 * | 11/2007 | Miyazaki ........... | H05B 41/2855 315/209 R |
| 7,354,174 B1 | 4/2008 | Yan | |
| 7,396,142 B2 | 7/2008 | Laizure, Jr. et al. | |
| 7,600,882 B1 | 10/2009 | Morejon et al. | |
| 7,726,836 B2 | 6/2010 | Chen | |
| 7,824,065 B2 | 11/2010 | Maxik | |
| 8,021,025 B2 | 9/2011 | Lee | |
| 8,253,316 B2 | 8/2012 | Sun et al. | |
| 8,272,762 B2 | 9/2012 | Maxik et al. | |
| 8,274,241 B2 | 9/2012 | Guest et al. | |
| 8,277,082 B2 | 10/2012 | Dassanayake et al. | |
| 8,282,250 B1 | 10/2012 | Dassanayake et al. | |
| 8,292,468 B2 | 10/2012 | Narendran et al. | |
| 8,322,896 B2 | 12/2012 | Falicoff et al. | |
| 8,371,722 B2 | 2/2013 | Carroll | |
| 8,400,051 B2 | 3/2013 | Hakata et al. | |
| 8,415,865 B2 | 4/2013 | Liang et al. | |
| 8,421,320 B2 | 4/2013 | Chuang | |
| 8,421,321 B2 | 4/2013 | Chuang | |
| 8,421,322 B2 | 4/2013 | Carroll et al. | |
| 8,449,154 B2 | 5/2013 | Uemoto et al. | |
| 8,502,468 B2 | 8/2013 | Li et al. | |
| 8,641,237 B2 | 2/2014 | Chuang | |
| 8,653,723 B2 | 2/2014 | Cao et al. | |
| 8,696,168 B2 | 4/2014 | Li et al. | |
| 8,740,415 B2 | 6/2014 | Wheelock | |
| 8,750,671 B1 | 6/2014 | Kelly et al. | |
| 8,752,984 B2 | 6/2014 | Lenk et al. | |
| 8,760,042 B2 | 6/2014 | Sakai et al. | |
| 2004/0201990 A1 | 10/2004 | Meyer | |
| 2004/0212420 A1 * | 10/2004 | Otake .................. | H02M 3/156 327/536 |
| 2005/0231133 A1 * | 10/2005 | Lys ..................... | F21S 48/325 315/291 |
| 2005/0264237 A1 * | 12/2005 | Ishizuka ............. | H05B 41/2886 315/209 R |
| 2008/0018261 A1 * | 1/2008 | Kastner .................. | F21V 23/00 315/192 |
| 2008/0157678 A1 * | 7/2008 | Ito .......................... | H05B 33/08 315/77 |
| 2009/0184618 A1 | 7/2009 | Hakata et al. | |
| 2009/0185105 A1 * | 7/2009 | Hasegawa .......... | H05B 41/2855 349/61 |
| 2010/0027258 A1 | 2/2010 | Maxik et al. | |
| 2010/0091495 A1 | 4/2010 | Patrick | |
| 2010/0148691 A1 * | 6/2010 | Kuo .................. | H05B 33/0815 315/291 |
| 2010/0164403 A1 * | 7/2010 | Liu ..................... | H05B 33/086 315/297 |
| 2011/0062872 A1 * | 3/2011 | Jin ..................... | H05B 33/0818 315/122 |
| 2011/0063843 A1 | 3/2011 | Cook | |
| 2011/0084614 A1 * | 4/2011 | Eisele ................ | H05B 33/0857 315/152 |
| 2011/0109248 A1 * | 5/2011 | Liu .................... | H02M 3/33561 315/297 |
| 2011/0260631 A1 * | 10/2011 | Park .................. | H05B 33/0815 315/165 |
| 2011/0273102 A1 | 11/2011 | van de Ven et al. | |
| 2012/0040585 A1 | 2/2012 | Huang | |
| 2012/0153866 A1 * | 6/2012 | Liu .................... | H02M 3/33561 315/294 |
| 2012/0176793 A1 | 7/2012 | Maxik et al. | |
| 2012/0257375 A1 | 10/2012 | Tickner et al. | |
| 2012/0262080 A1 * | 10/2012 | Watanabe .......... | H05B 33/0818 315/210 |
| 2012/0287601 A1 | 11/2012 | Pickard et al. | |
| 2013/0015774 A1 * | 1/2013 | Briggs ............... | H05B 33/0815 315/186 |
| 2013/0026923 A1 | 1/2013 | Athalye et al. | |
| 2013/0026925 A1 | 1/2013 | Ven et al. | |
| 2013/0069535 A1 | 3/2013 | Athalye | |
| 2013/0069547 A1 | 3/2013 | van de Ven et al. | |
| 2013/0141003 A1 * | 6/2013 | Esaki .................... | H05B 37/02 315/224 |
| 2013/0162149 A1 | 6/2013 | van de Ven et al. | |
| 2013/0162153 A1 | 6/2013 | van de Ven et al. | |

(56) References Cited

U.S. PATENT DOCUMENTS

| | | |
|---|---|---|
| 2013/0169159 A1 | 7/2013 | Lys |
| 2013/0175934 A1* | 7/2013 | Fujita .................. G09G 3/3426 315/186 |
| 2013/0250575 A1 | 9/2013 | Wilcox et al. |
| 2013/0293135 A1 | 11/2013 | Hu et al. |
| 2014/0062333 A1 | 3/2014 | Sonobe |
| 2014/0232270 A1* | 8/2014 | Kimura ............. H05B 33/0815 315/122 |
| 2015/0028761 A1* | 1/2015 | Vonach ............. H05B 33/0815 315/201 |

FOREIGN PATENT DOCUMENTS

| | | |
|---|---|---|
| GB | 2345954 A | 7/2000 |
| JP | H09265807 A | 10/1997 |
| JP | 2000173304 A | 6/2000 |
| JP | 2001118403 A | 4/2001 |
| JP | 2007059930 A | 3/2007 |
| JP | 2008288183 A | 11/2008 |
| JP | 2009117346 A | 5/2009 |
| JP | 3153766 U | 9/2009 |
| JP | 2009277586 A | 11/2009 |
| WO | 0124583 A1 | 4/2001 |
| WO | 0160119 A2 | 8/2001 |
| WO | 2012011279 A1 | 1/2012 |
| WO | 2012031533 A1 | 3/2012 |

OTHER PUBLICATIONS

Cree, Inc., U.S. Appl. No. 14/292,001, filed May 30, 2014, 27 pages.

U.S. Appl. No. 61/984,467, filed Apr. 25, 2014.

U.S. Appl. No. 14/071,733 entitled, "Minimum off time Control Systems and Methods for Switching Power Converters in Discontinuous Conduction Mode,".

* cited by examiner

HIGH EFFICIENCY DRIVER CIRCUIT WITH FAST RESPONSE

CROSS-REFERENCE TO RELATED APPLICATION

This application claims priority from provisional patent application Ser. No. 61/984,467, filed Apr. 25, 2014, the entire disclosure of which is incorporated herein by reference.

BACKGROUND

Light emitting diode (LED) lighting systems are becoming more prevalent as replacements for existing lighting systems. LEDs are an example of solid-state lighting (SSL) and have advantages over traditional lighting solutions such as incandescent and fluorescent lighting because they use less energy, are more durable, operate longer, can be combined in multiple color arrays that can be controlled to deliver virtually any color light, and generally contain no lead or mercury. In many applications, one or more LED dies (or chips) are mounted within an LED package or on an LED module, which may make up part of a lighting unit, lighting system, lamp, "light bulb" or more simply a "bulb," which includes at least one power supply (also called a "driver" or "driver circuit") to power the LEDs.

Drivers or power supplies may be used in electronic applications to convert an input voltage to a desired output voltage to power electronic devices such as the LEDs of a lamp or lighting system. Some power supplies may be classified as either a linear power supply or a switched-mode power supply. Switched-mode power supplies may be configured to operate more efficiently than linear power supplies. A switched-mode power supply may include a switching device that, when switching on and off, stores energy in an inductor or similar energy storage element and discharges the stored energy to an output of the switched-mode power supply. The switching device may be controlled by a control circuit or controller, which outputs switching signals to turn the switching device on and off. FIG. 1 illustrates a single-ended primary inductor converter (SEPIC) circuit 100 that can be used in some switched-mode power supplies. The circuit uses two inductors L1 and L2, an inline capacitor Ci, a diode D, and output capacitor Cout, and a transistor Q to provide a switching function. Other commonly used converter circuits include a boost converter and a buck converter. FIG. 2 illustrates a boost converter 200, which has only one inductor L1. FIG. 3 illustrates a buck converter 300, in which switching device Q is in-line with the inductor L1.

While the color of the light emitted from an LED primarily depends on the composition of the material used, its brightness is directly related to the current flowing through the pn junction. Therefore, a driver providing a constant current is desired. A driver for an LED lighting system therefore necessarily includes or acts as a current regulator. FIG. 4 shows a lighting apparatus 400 in which a plural number of LED strings 1 to n are driven by constant current regulators 1 through N. Each current regulator receives an input voltage V and regulates the same or different current through each respective LED string, which includes at least one LED. LED strings 1 to n may generate light of the same color or of different colors depending on the color temperature requirements of the lighting apparatus 400.

SUMMARY

Embodiments of the present invention relate to an LED (light-emitting-diode) driver with power factor correction (PFC) to drive a plural number of LED strings of the same color or mixed colors. The LED driver according to example embodiments includes a voltage converter stage with a feedback loop. The LED driver can include a speed-up circuit, and/or an adaptive output voltage control circuit, also referred to herein as an overhead control circuit. In some embodiments a capacitor, which couples the input to the output, enables direct energy transfer from the input to the output. In at least some embodiments, an input inductor helps to attenuate input current ripple, which could otherwise lead to low high-frequency winding loss in other inductive elements. The LED driver according to embodiments of the present invention has high efficiency. The speed-up circuit can prevent sag of the output voltage of the converter stage to ensure desired current regulation of one or more LED strings and prevent flickering of the LEDs. The adaptive control circuit can adjust the output voltage of the driver to an optimum value to improve the operating efficiency of the current regulator connected to the LEDs.

A switched-mode driver according to at least some embodiments of the invention includes an input, and an output connectable to a load. The switched-mode driver circuit can be used in a LED lighting system where strings of LEDs connected to the output serve as the load. A converter stage receives an input voltage at the input and provides the output voltage to the load. In some embodiments, the input voltage may come from a rectifier to which the converter stage is connected, and/or an input filter. The converter stage includes a switching device and may include a power factor controller (PFC). The converter stage can be based on any circuit topology, for example, SEPIC, boost, buck, or buck-boost. A driver using any of these topologies can further include a speed-up circuit connected to the switching device. The speed-up circuit is operable to increase current at the input in response to an increased demand for current by the load. A driver using any of these topologies can also, or instead, include an overhead control circuit connected to the output to inject a control signal into the feedback loop of the converter stage to adaptively adjust the output voltage in response to changes in operating efficiency of the load. The load can include LEDs (including one or more parallel strings of LEDs) or a combination of LED strings and current regulators.

In some embodiments, the speed-up circuit can include a voltage monitor. In some embodiments, the voltage monitor is connected to the output of the driver to respond to changes in the output voltage. In some embodiments, the voltage monitor is connected to a current amplifier to respond to the increased demand for current by the load, since the current amplifier can provide a voltage indicative of changes in current.

In some embodiments, the overhead control circuit can include one or more current regulators, for example, buck current regulators, one connectable to one of one or more parallel LED strings and an overhead controller connected to the buck current regulators to inject a control signal into the feedback loop of the converter stage to alter the output voltage in response to the duty cycle of the buck current regulators. In some embodiments, the overhead control circuit also includes an error amplifier connected to the overhead controller. In some embodiments, such as where the overhead controller is connected to the output of the driver, the overhead control circuit includes a resistor connected to the overhead controller to receive the control signal, and a diode connected between the resistor and the error amplifier.

DETAILED DESCRIPTION

Figure 1:
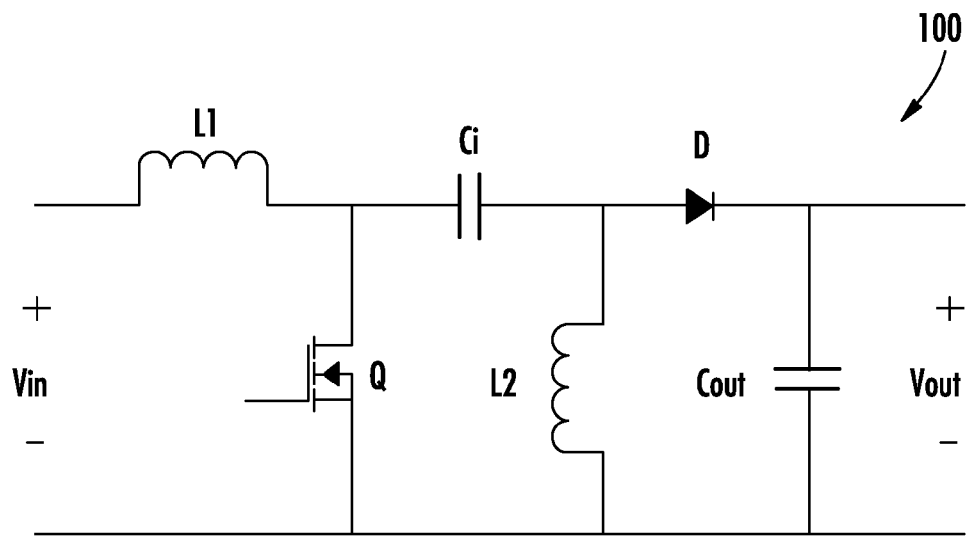
FIG. 1, FIG. 2 and FIG. 3 are schematic diagrams of converter circuits that can be used as a driver or a portion of a driver for an LED lighting system.
Figure 2:
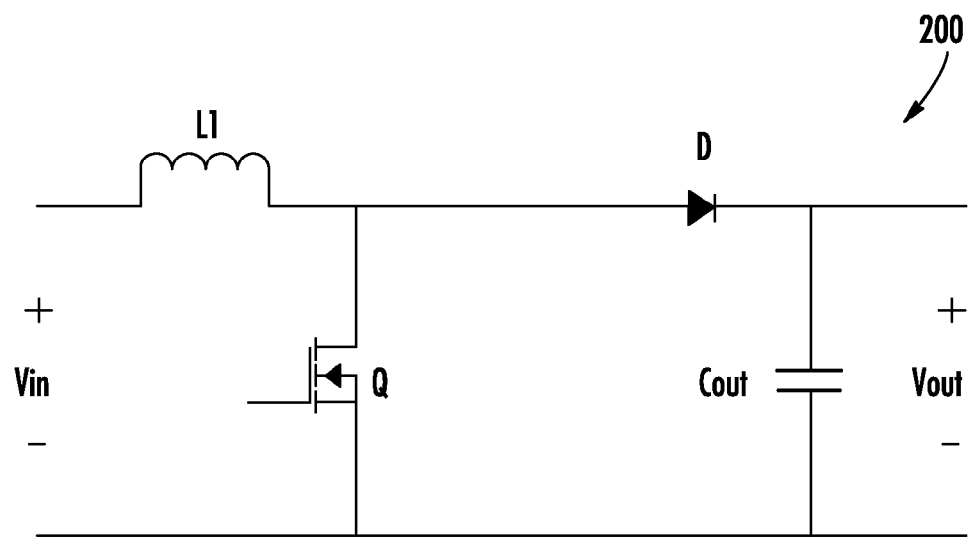
Figure 3:
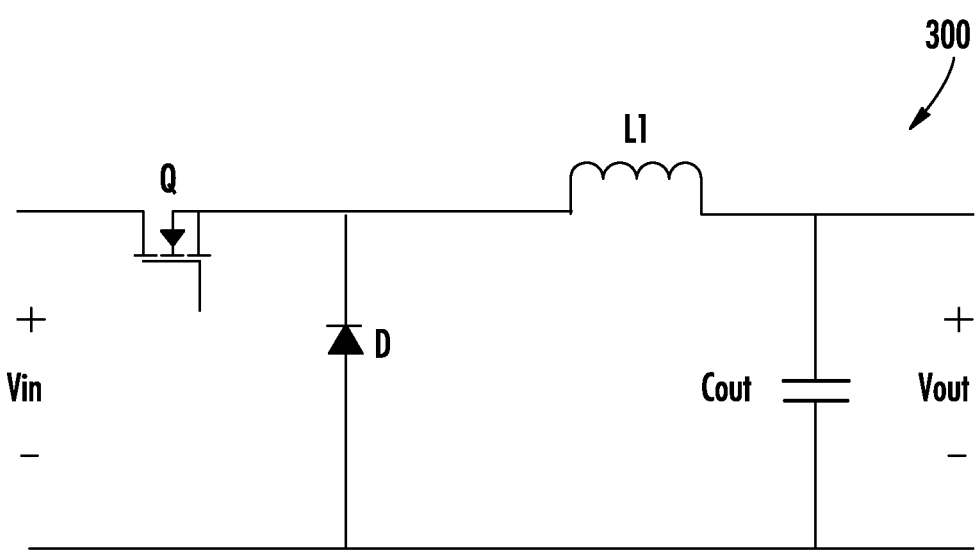
Figure 4:
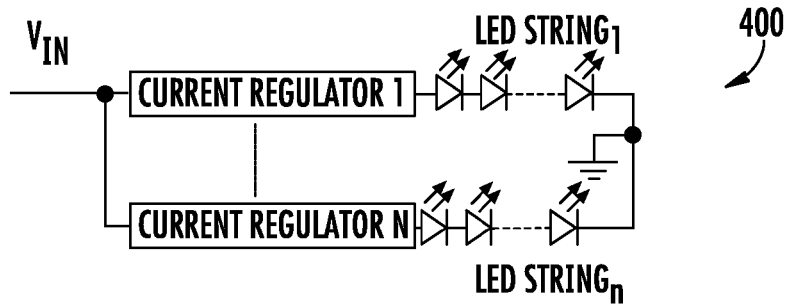
FIG. 4 is a schematic diagram of a driver for an LED lighting system that acts as a current regulator.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid-state light emitter" or "solid-state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid-state light emitters and/or multiple lumiphoric materials (i.e., in combination with at least one solid-state light emitter) may be used in a single device, such as to produce light perceived as white or near-white in character. In certain embodiments, the aggregated output of multiple solid-state light emitters and/or lumiphoric materials may generate warm white light output having a color temperature range of from about 2700K to about 4000K.

Solid-state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid-state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials may be associated with a lumiphor, a lumiphor binding medium, or a lumiphor support element that may be spatially segregated from a solid-state emitter.

Figure 5:
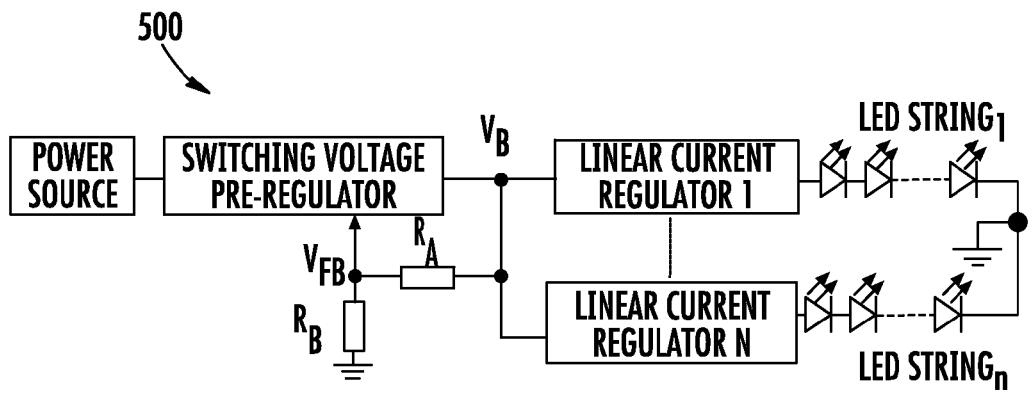
FIG. 5 and FIG. 6 are diagrams of LED lighting systems with which embodiments of the present invention may find use.
Figure 6:
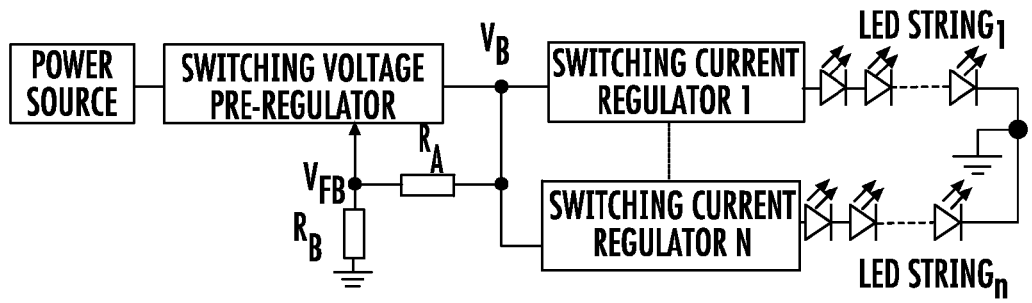

Electronic devices such as LED lighting systems can work with a variety of different types of power supplies or drivers. For example, a buck converter, boost converter, buck-boost converter, or single ended primary inductor converter (SEPIC) circuit could all be used as a switching driver or a portion of a switching driver for an LED lighting system or solid-state lamp. A linear power supply can also be used. The current regulators used in LED driver may be linear current regulators or switching current regulators. FIG. 5 illustrates a lighting apparatus 500 with linear current regulators 1 through N. FIG. 6 illustrates a lighting apparatus with switching current regulators 1 through N. In FIGS. 5 and 6, a power source (AC or DC) provides an input voltage for a switching voltage pre-regulator, which regulates output voltage $V_B$. Each current regulator receives the output voltage, sometimes referred to as the bus voltage $V_B$ and regulates the driving current through each LED string. The power source can be a battery or an AC source such as the utility mains. The switching pre-regulator can include any type of voltage converter. In each of FIG. 5 and FIG. 6, a voltage divider formed by resistors $R_A$ and $R_B$ provides a feedback voltage $V_{FB}$ to the pre-regulator.

A linear driver generally has lower cost than its switching counterpart; however, it also has lower efficiency depending on the voltage drop across the driver circuit. With a switching driver, a power source (DC or AC) provides an input voltage for the voltage converter stage, which regulates an output voltage, sometimes also referred as the bus voltage $V_B$. Current regulators are then used with each LED or, in the case of most fixed lighting systems, strings of LEDs. A current regulator receives the bus voltage $V_B$ and regulates the driving current through each LED string. As shown above, the connection between the output voltage terminal of the voltage converter stage and the circuitry that controls the switching device forms a feedback loop. Also as can be appreciated from the above, the voltage converter stage together with any input filtering and a rectifier (if the system is to be powered from the AC lines) can be referred to as the pre-regulator. When the pre-regulator includes a switching voltage converter it can be referred to as a switching voltage pre-regulator or a switching pre-regulator. The feedback loop can be non-isolated, meaning the switching device is controlled by a direct connection to the output voltage, or isolated, meaning an optical isolator or similar device is disposed between the output voltage and the switching device.

Figure 7:
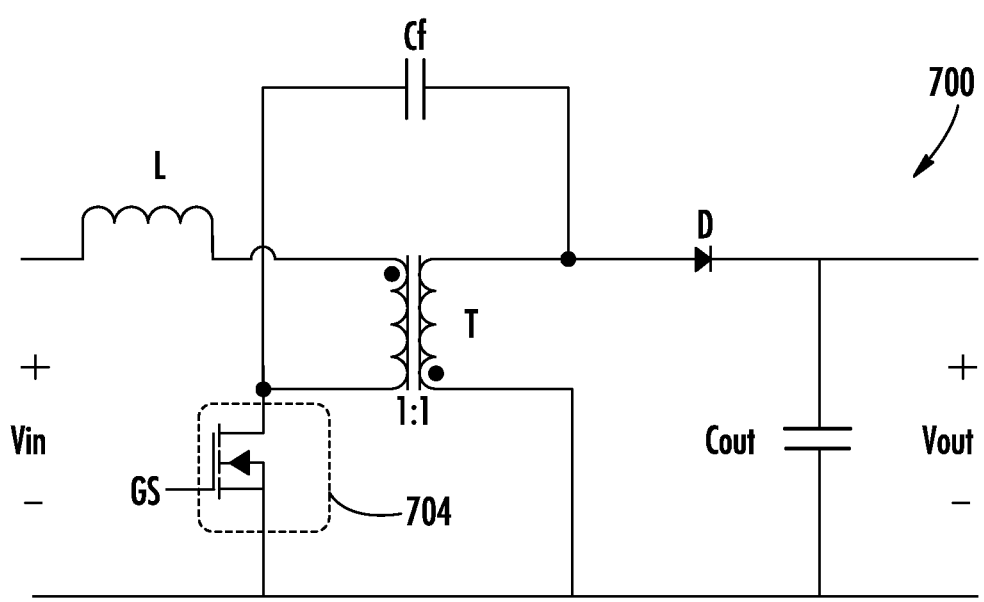
FIG. 7 is a schematic diagram of a converter circuit that can find use with embodiments of the invention.

As previously discussed, a driver using the SEPIC topology includes two inductors. The inductors can be coupled, that is they can be wound on the same core to reduce the component count for the driver. If the inductors are loosely coupled, they exhibit large leakage inductance. The leakage inductance appears as an input inductor in-line before the two coupled inductors. If the inductors are tightly coupled they essentially form a transformer. FIG. 7 is a schematic diagram of a circuit 700 based on a SEPIC design using a transformer as the magnetic element. The circuit takes a DC input voltage Vin, and provides a DC output voltage, Vout across output capacitor Cout. The circuit includes an input inductor, L, a transformer, T, and a floating capacitor, Cf. If the transformer were instead two loosely-coupled inductors, L might be the leakage inductance and a physical inductor might not be used. The circuit also includes switching device 704, which in this example is a single field-effect transistor (FET), more specifically a MOSFET. A controller or control circuit is connected to the gate signal (GS) terminal of the driver, which is in turn connected to the gate of the MOSFET in this example. The switching device can also be more complex, such as a circuit made up of multiple transistors, or an integrated circuit.

A simply control IC and a suitable control circuit can provide the gate signal discussed above, and such a control circuit is disclosed in U.S. patent application Ser. No. 14/071,733, entitled, "Minimum off time Control Systems and Methods for Switching Power Converters in Discontinuous Conduction Mode," which is incorporated herein by reference. The embedded controller that drives the switching element can do so in a manner that maintains a high degree of power factor control (PFC). Such a controller is sometimes referred to as a PFC controller. The PFC controller turns the switching element on and off in such a manner so that the input current waveform follows the shape of the input voltage waveform. A controller IC such as the L6562 or L6564 from STMicroelectronics, or the UCC28810 or UCC28811 from Texas Instruments can be used as a PFC controller to achieve high power factor.

In the example of converter circuit 700 shown in FIG. 7, the transformer T is used with an input winding connected to the input inductor and the switching device, and an output winding connected to ground or the reference terminal for the system. Floating capacitor Cf is connected between the input winding and the output winding of transformer T. In at least some embodiments, the transformer is a one-to-one transformer. The floating capacitor should have sufficient capacitance to keep a steady voltage within switching cycles. Voltage variation will follow the input voltage of the circuit.

In operation, the topology described above keeps the voltage across the input inductor very low to reduce input current ripple of the circuitry. An output diode D, is connected to the output winding of transformer T and supplies output current during the switching cycle, and the output capacitor Cout is connected to the output diode since it is connected across the output of the circuit.

Figure 8:
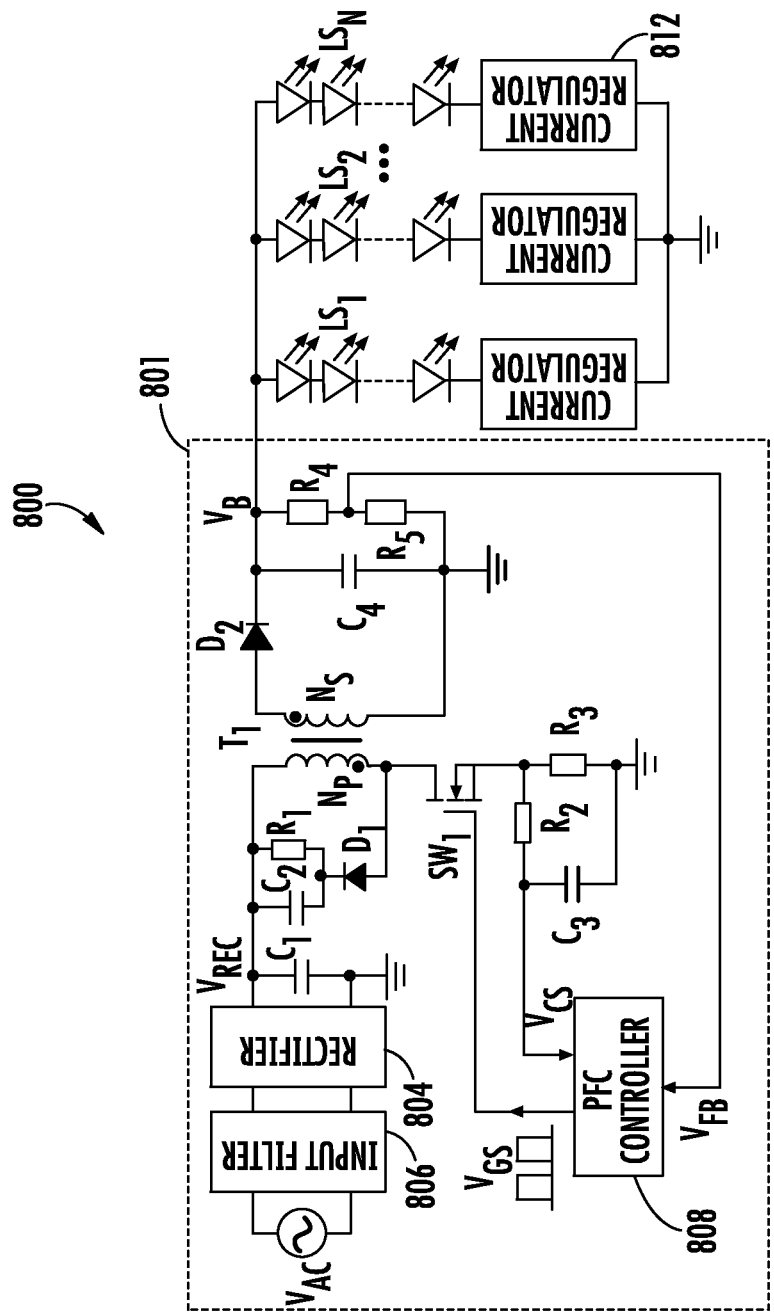
FIG. 8, FIG. 9, FIG. 10, FIG. 11, and FIG. 12 show schematic diagrams of driver circuits with which some embodiments of the present invention could be used.
Figure 9:
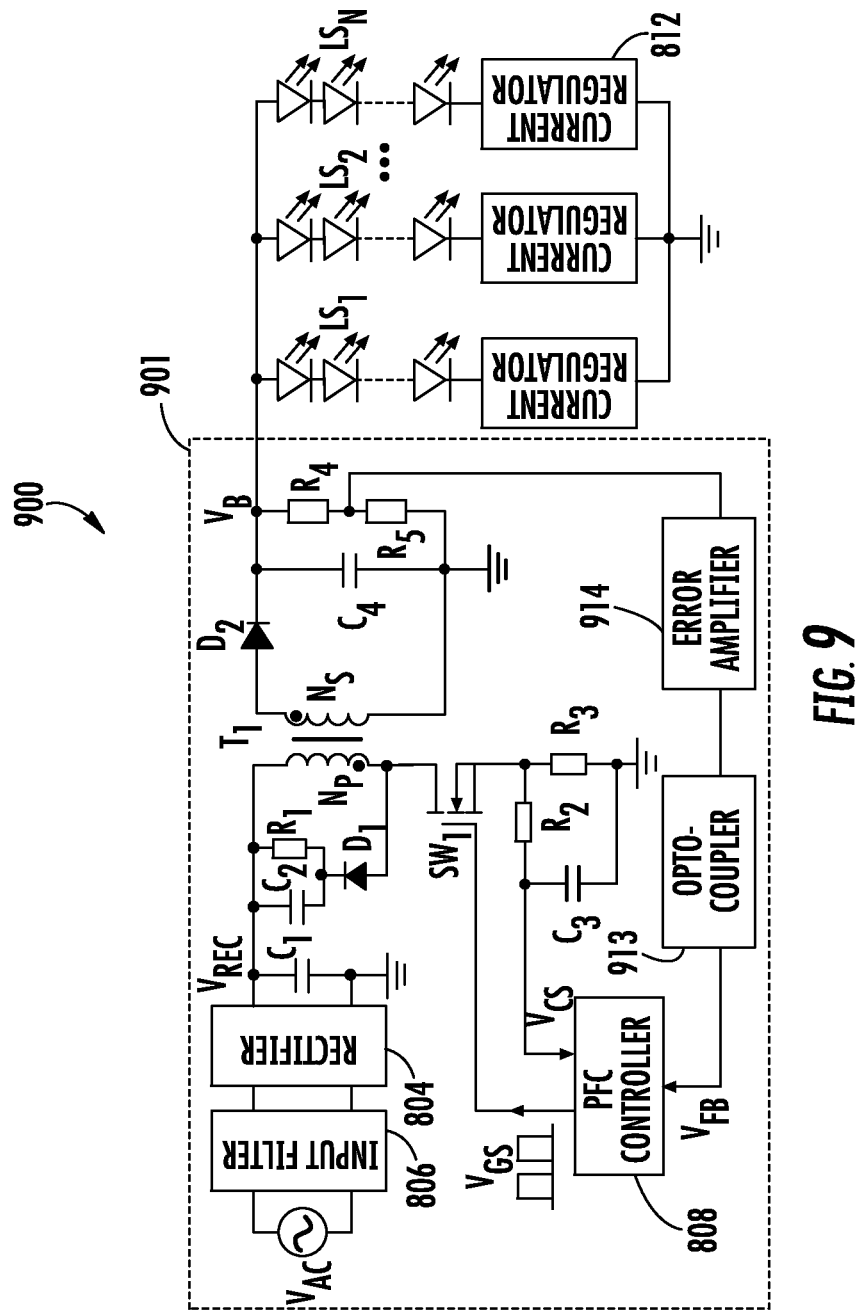

The voltage pre-regulators shown in FIGS. 8 and 9 include flyback converters that could be used with the speed-up circuit and/or the overhead control circuit discussed herein. $C_1$ is an input capacitor. They provide a regulated voltage for the current regulators and also achieve power factor correction (PFC), which can be important for high power applications. An advantage of the flyback converter is that it can step up or down the voltage to accommodate LED loads with different string voltages. However, the leakage inductance in the flyback transformer usually causes voltage spikes across the main switch $SW_1$. Therefore, a snubber circuit, comprising $R_1$, $D_1$, and $C_2$, as shown in circuit 800 of FIG. 8 and circuit 900 of FIG. 9, is needed to absorb the leakage energy and suppress the voltage spikes.

Flyback pre-converters 801 in FIGS. 8 and 901 in FIG. 9 have relatively low efficiency because of leakage inductance and the snubber circuit. The circuits in FIG. 8 and FIG. 9 also include a rectifier 804, input filter 806, and PFC controller 808. Current through the LED strings $LS_1$ through $LS_N$ is regulated by identical current regulators 812. Transformer $T_1$ includes a primary winding $N_P$ and a secondary winding $N_S$ and the converter stage of the circuit received voltage $V_{rec}$ from the rectifier. $C_3$, $R_2$ and $R_3$ provide voltage $V_{CS}$ to the PFC controller. $C_4$ is an output capacitor for the converter stage. $R_4$ and $R_4$ form a voltage divider to provide feedback of the bus voltage for the feedback loop. Circuit 800 in FIG. 8 is non-isolated, whereas circuit 900 in FIG. 9 is isolated by opto-coupler 913 and error amplifier 914.

Figure 10:
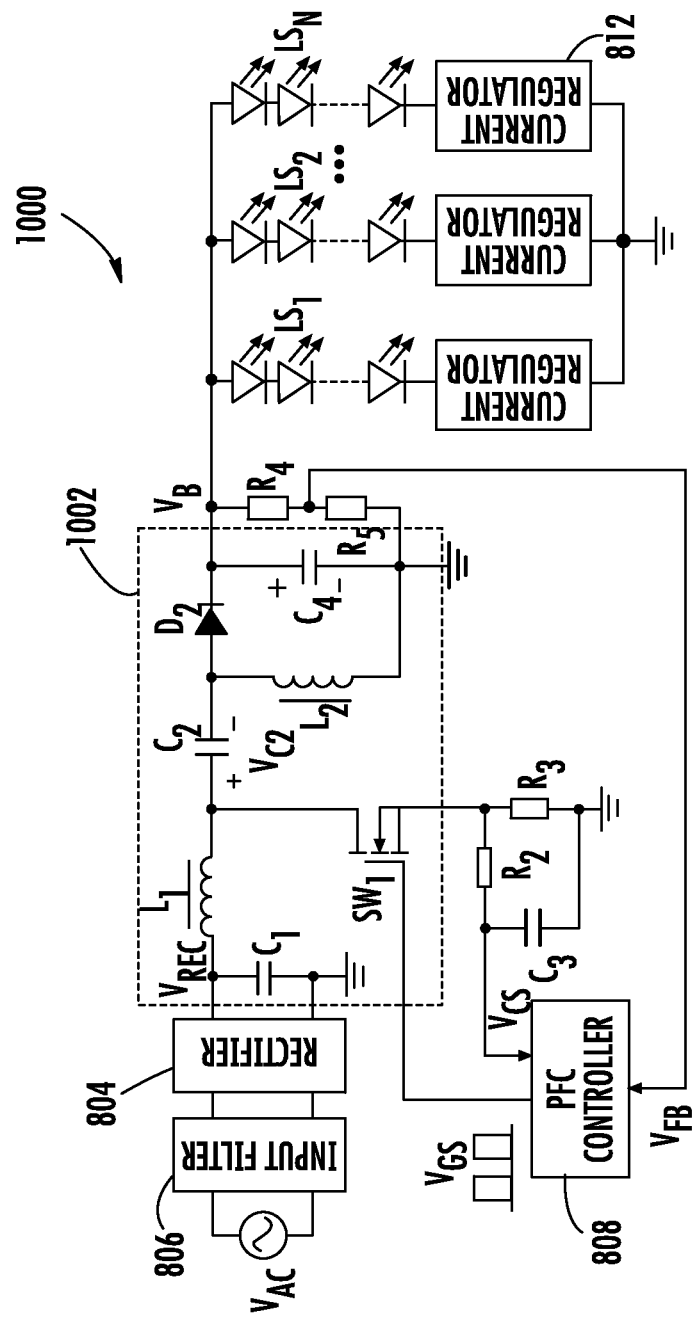

FIG. 10 shows a non-isolated driver 1000 with a SEPIC converter stage 1002, which could be used with an embodiment of the invention and does not have the issues of the flyback type driver shown in FIGS. 8 and 9. The pre-converter stage again includes the input filter for EMI, a rectifier, and the PFC controller. The SEPIC converter stage includes, inductors $L_1$ and $L_2$, the transistor switch $SW_1$, the diode $D_2$, and capacitors $C_1$, $C_2$ and $C_4$. Voltage $V_{rec}$ is the rectified source voltage and serves as the input voltage of the converter stage. When $SW_1$ is closed, a current flows through inductor $L_1$ and $SW_1$ and another current flows through inductor $L_2$ and capacitor $C_2$ as well as $SW_1$, capacitor $C_2$ is discharged while inductors $L_1$ and $L_2$ store magnetic energy; in the meantime, output capacitor $C_4$ is discharged by the LED loads $LS_1$ to $LS_n$, which have constant currents regulated by the current regulators. When $SW_1$ is open, the energy stored in inductor $L_1$ is released and forces the current to continue to flow through inductor $L_1$, $C_2$ and $D_2$ charging the output capacitor $C_4$ and providing current to the LED loads; meanwhile, energy stored in inductor $L_2$ is also released and forces the current to continue to flow through inductor $L_2$, diode $D_2$, charging the output capacitor and also providing the current to the LED loads.

Still referring to FIG. 10, the PFC controller 808 turns on or off switch $SW_1$ in such as a manner so that the input current waveform follows the shape of the input voltage waveform. A controller such as an IC L6562 or L6564 from STMicroelectronics, or a UCC28810 or UCC28811 from Texas Instruments can be used as the PFC controller to achieve high power factor. Unlike the converter with a flyback transformer, the circuit shown in FIG. 10 will not induce voltage spikes across $SW_1$ because of the positioning of the voltage clamping capacitor $C_2$. Another advantage of this circuit is that capacitor $C_2$ couples the input and output, enabling a direct energy transfer from the input to the output through inductor $L_1$, capacitor $C_2$, and diode $D_2$, which generally boosts the overall efficiency of the LED driver circuit. A disadvantage of the circuit shown in FIG. 10 is that it has two inductors, namely $L_1$ and $L_2$.

Figure 11:
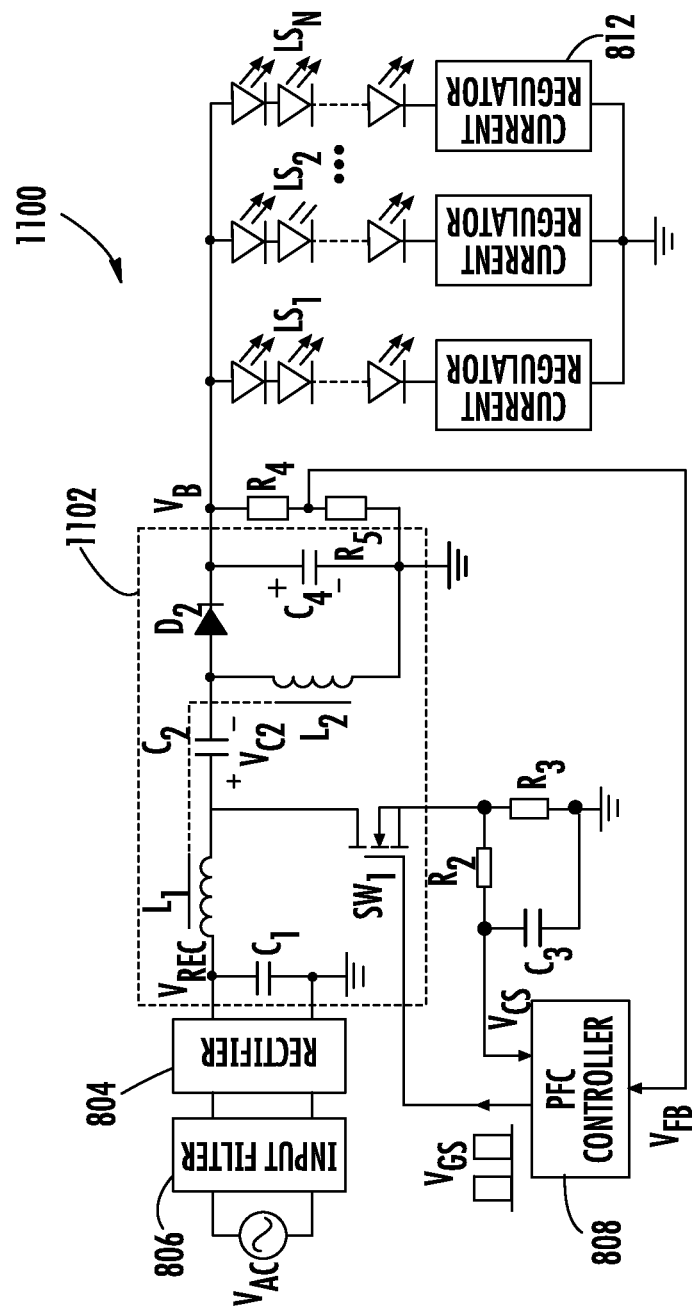
Figure 12:
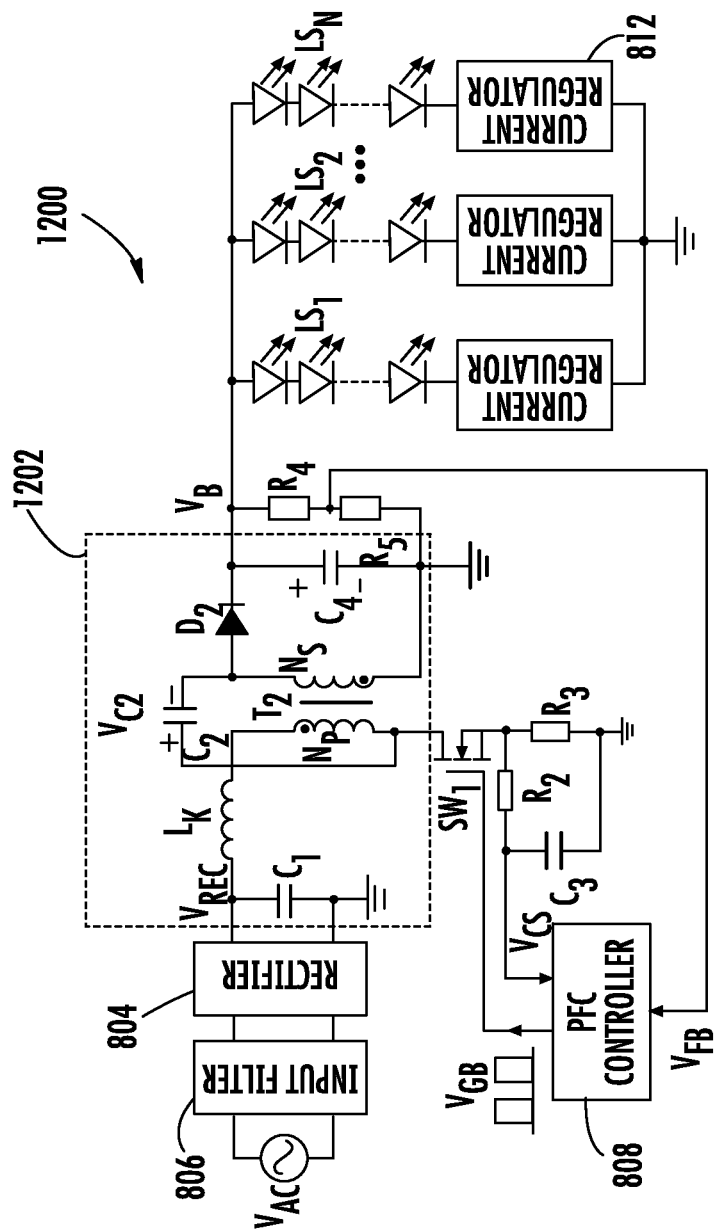

FIG. 11 shows an LED driver 1100 with the two inductors in the converter stage 1102 coupled together; therefore, they can be wound on the same core to reduce the component count. Inductors $L_1$ and $L_2$ can be loosely coupled, i.e., they have large leakage inductance; or tightly coupled, i.e., they have low leakage inductance. FIG. 12 shows the circuit of a driver with two coupled inductors with windings $N_P$ and $N_S$ forming a leaky transformer $T_2$, and an equivalent leakage inductance $L_k$ in series with the primary winding $N_P$. The leakage inductance $L_k$ can attenuate the input current ripple and reduce EMI. Therefore, a large leakage inductance is beneficial for EMI suppression. However, a large leakage inductance in a transformer generally leads to high copper loss in windings due to high frequency effects. Alternately, an external inductor $L_1$ can be used to serve the purpose of attenuation of the input current ripple and EMI suppression, as shown and discussed below.

Figure 13:
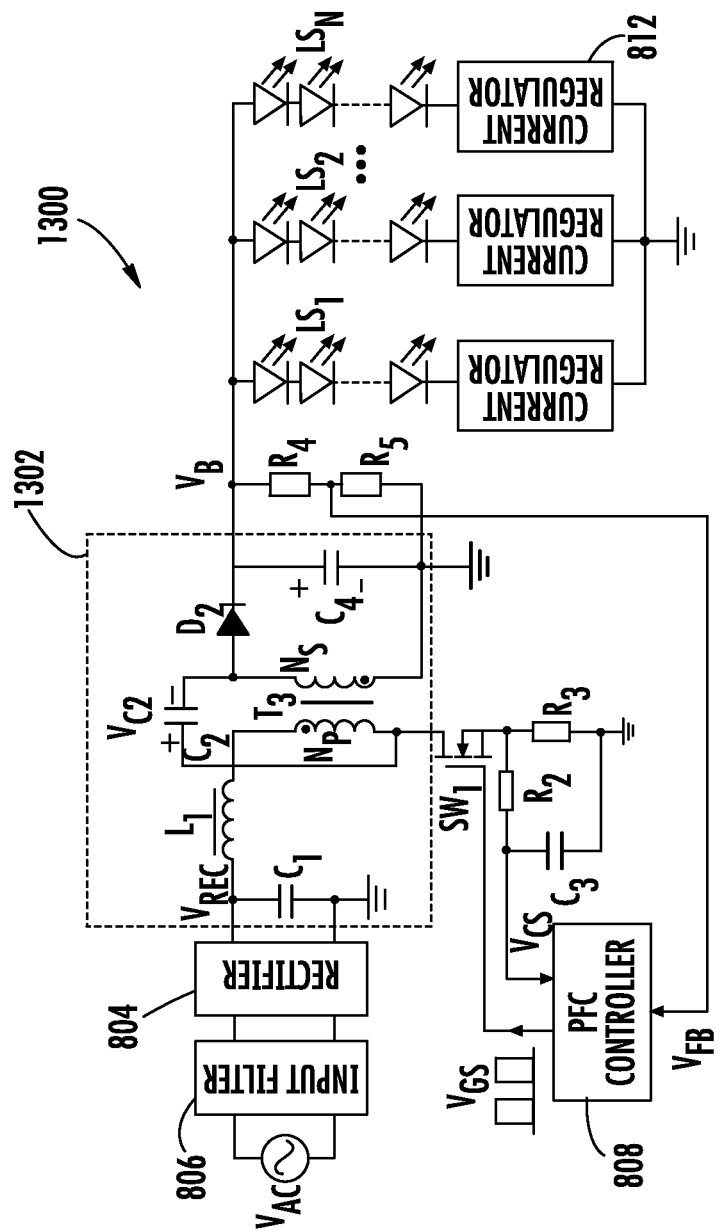
FIG. 13 is a schematic diagram of a driver that uses a converter stage based on the circuit of FIG. 7 according to example embodiments of the present invention.

FIG. 13 illustrates a driver circuit 1300 making use of a converter stage 1302 as just discussed. The two inductors are wound on the same core, essentially forming a transformer $T_3$ with good coupling, reducing high-frequency induced copper loss. $N_P$ is the primary winding and $N_S$ is the secondary winding. With proper design of the transformer, the input inductor $L_1$, and capacitor $C_1$, the input current ripple for the driver circuit can be significantly reduced, achieving near ripple-free input current. The input current ripple, $\Delta i_{L1}$, is determined by the equation below, where $T_{ON}$ is the turn-on time of the main switch $SW_1$.

$$\Delta i_{l1} = \frac{V_{rec} - \frac{N_P}{N_S} V_{C2}}{L_1} T_{on}$$

Since the average of voltages across $L_1$, and windings $N_P$ and $N_S$ is zero, the DC voltage across floating capacitor $C_2$ has to be equal to the rectified input voltage $V_{rec}$ from input rectifier 804, which follows input filter 806, which is connected to the mains voltage, $V_{AC}$. Therefore, $\Delta i_{L1}=0$ if $N_P=N_S$, which means that there is essentially no input-current ripple at the switching frequency. The benefit of having a near ripple-free input current is that there is no high-frequency copper loss in the primary winding $N_P$ (only power loss caused by DC current), boosting the overall efficiency of the LED driver, and the size of the filter 306 at the input can be smaller.

Still referring to FIG. 13, the feedback loop for the driver circuit 1300 is managed by PFC controller 808, which receives feedback voltage $V_{FB}$ and a voltage $V_{CS}$ representing the filtered, sensed current signal across resistor $R_2$ and outputs gate drive voltage $V_{GS}$. Capacitor $C_3$ and resistors $R_3$, $R_4$, and $R_5$ complete the feedback loop and switching portions of the driver circuit. Diode $D_2$ and output capacitor $C_4$ complete the converter stage 1302 in this example. The driver circuit drives a plurality of LED light strings, $L_{S1}$ through $L_{SN}$. An identical current regulator 812 is connected to each light string. Current regulators 312 may be switching regulators or linear regulators.

In a PFC controlled voltage converter, the feedback-loop response is usually slow in order to have a good power factor. A slow loop response generally leads to a sag or an overshoot of the output voltage $V_B$ or current when there is a sudden change in the LED load, such as during PWM (pulse-width modulated) dimming or during startup. In an LED fixture with a buck converter or a linear regulator used for current regulation of LED strings, when the sag of the converter output voltage is so large that the minimum output voltage becomes lower than the desired LED string voltages, flicker or a short-time turn-off of the LED strings may be observed. In order to alleviate this problem, a feedback-loop response speed-up circuit is needed to prevent the output voltage from dipping too much.

Figure 14:
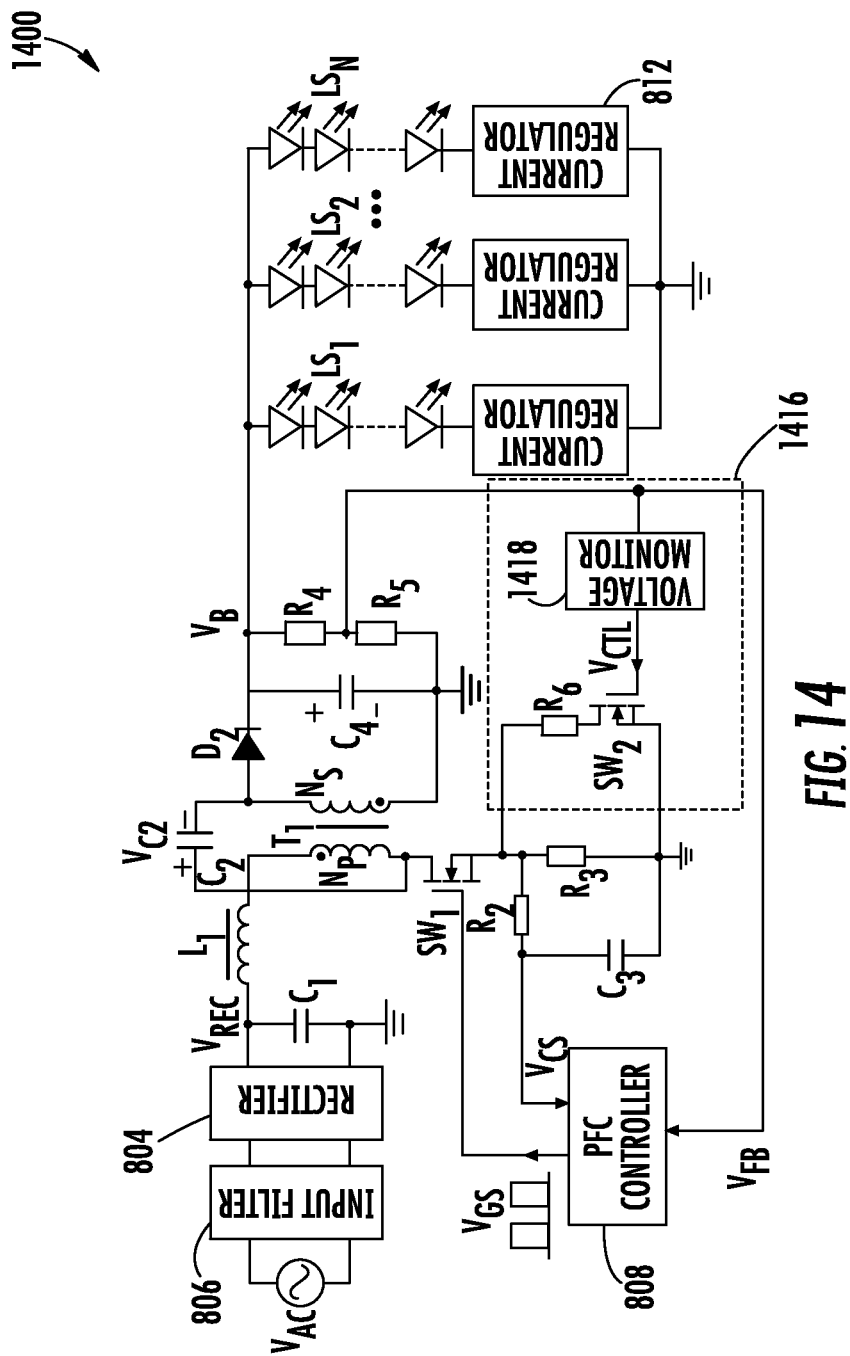
FIG. 14 is a schematic diagram of a driver that includes a speed-up circuit according to example embodiments of the present invention.

FIG. 14 is a schematic diagram of a driver similar to that of FIG. 13, but with speed-up circuit 1416 including an output voltage monitor 1418, which can be a hardware-based comparator, a separate microcontroller, or a portion of the microcontroller that is also performing other functions such as serving as PFC controller 808. Transistor $SW_2$ serves as a control switch, and a current sensing resistor $R_6$ is connected in series with transistor $SW_2$. The voltage monitor 1418 samples the output voltage $V_B$ and compares it to a given threshold. If the sampled voltage is lower than the given threshold because of a sudden increase of load, a drop of the output voltage is detected, and the control signal $V_{CTL}$ is generated to turn on transistor $SW_2$. As a result, resistor $R_6$ is paralleled with resistor $R_3$, effectively reducing the size of the current sensing resistance. For a slow feedback loop, the reference voltage in the PFC controller for evaluating the sensed current signal $V_{CS}$ remains almost unchanged, leading to a longer turn-on time of the main switch $SW_1$. Therefore, the current through the main switch $SW_1$ and inductor $L_1$ will increase and a higher current is drawn from the input. Because of the higher input current, the output voltage is boosted faster and rises back to the set value sooner. Because of the fast response of the voltage monitor and increased input power in response to the output of the voltage monitor, severe output-voltage sag is prevented so that the bus voltage $V_B$ will not drop below the LED string voltages and no flicker occurs.

Figure 15:
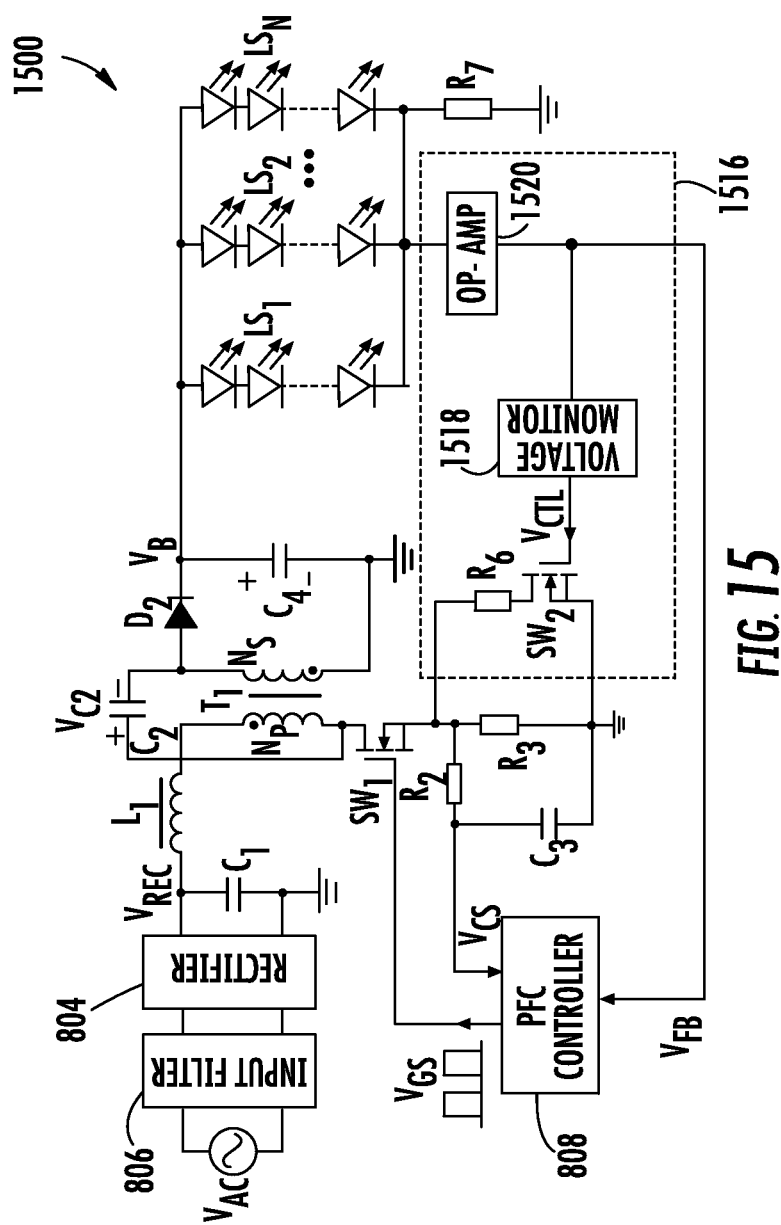
FIG. 15 is a schematic diagram of a driver that includes a speed-up circuit according to additional example embodiments of the present invention.

FIG. 15 shows a driver circuit 1500 in which the voltage monitor is used to monitor an amplified current sensing signal instead of the output of the converter stage. Speed-up circuit 1516 in this case also includes an output voltage monitor 1518, the control switch $SW_2$, and the current sensing resistor $R_6$ in series with switch $SW_2$. Op-Amp 1520 amplifies the sensed current signal across current sensing resistor $R_7$, and the voltage monitor samples the output voltage from the Op-Amp and compares it to a given threshold. If the sampled voltage is lower than the given threshold because of a sudden increase of load, a drop of the output voltage is detected, and a control signal $V_{CTL}$ is generated to turn on the switch $SW_2$. As a result, resistor $R_6$ is again paralleled with resistor $R_3$, reducing the effective resistance of the current sensing resistor. The current through the main switch $SW_1$ and inductor $L_1$ will increase and a higher current and power is drawn from the input. Therefore, severe output-voltage sag is prevented so that the bus voltage $V_B$ will not drop below the LED string voltages and no flicker occurs.

Figure 16:
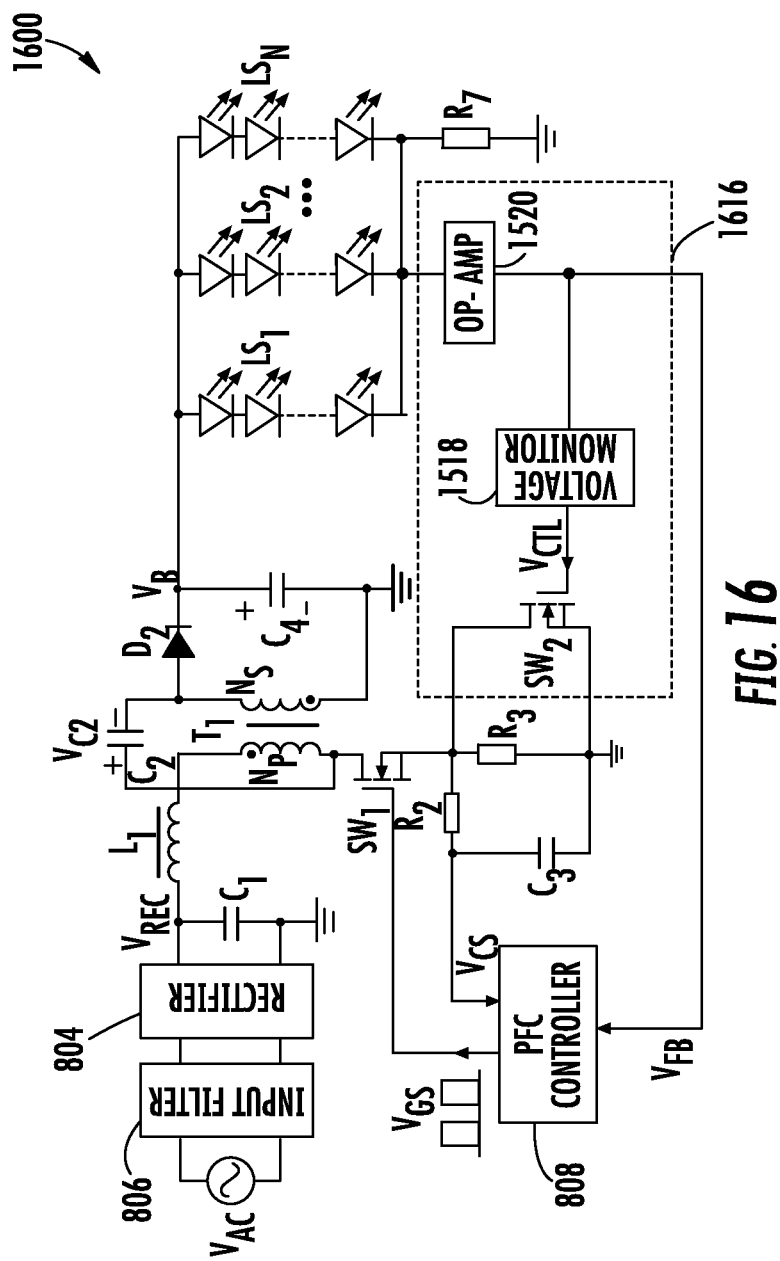
FIG. 16 is a schematic diagram of a driver that includes a speed-up circuit according to further example embodiments of the present invention.

As an alternative to the driver circuit of FIG. 15, $R_6$ can be replaced with a short, in which case, the turn-on resistance of the switch $SW_2$ can serve the same purpose as the resistor. FIG. 16 shows a driver circuit 1600 with such a design. When there is a shortage of LED current, a control signal $V_{CTL}$ is generated to turn on the switch $SW_2$. As a result, the turn-on resistance of switch $SW_2$ is paralleled with resistor $R_3$, effectively reducing the current sensing resistance. The current through the main switch SW1 and inductor $L_1$ will increase and a higher current and power is drawn from the input. Therefore, severe output-voltage sag is prevented so that the bus voltage $V_B$ will again not drop below the LED string voltages. This speed-up circuit topology is also shown in FIG. 17, discussed below, although with a different converter stage topology.

Figure 17:
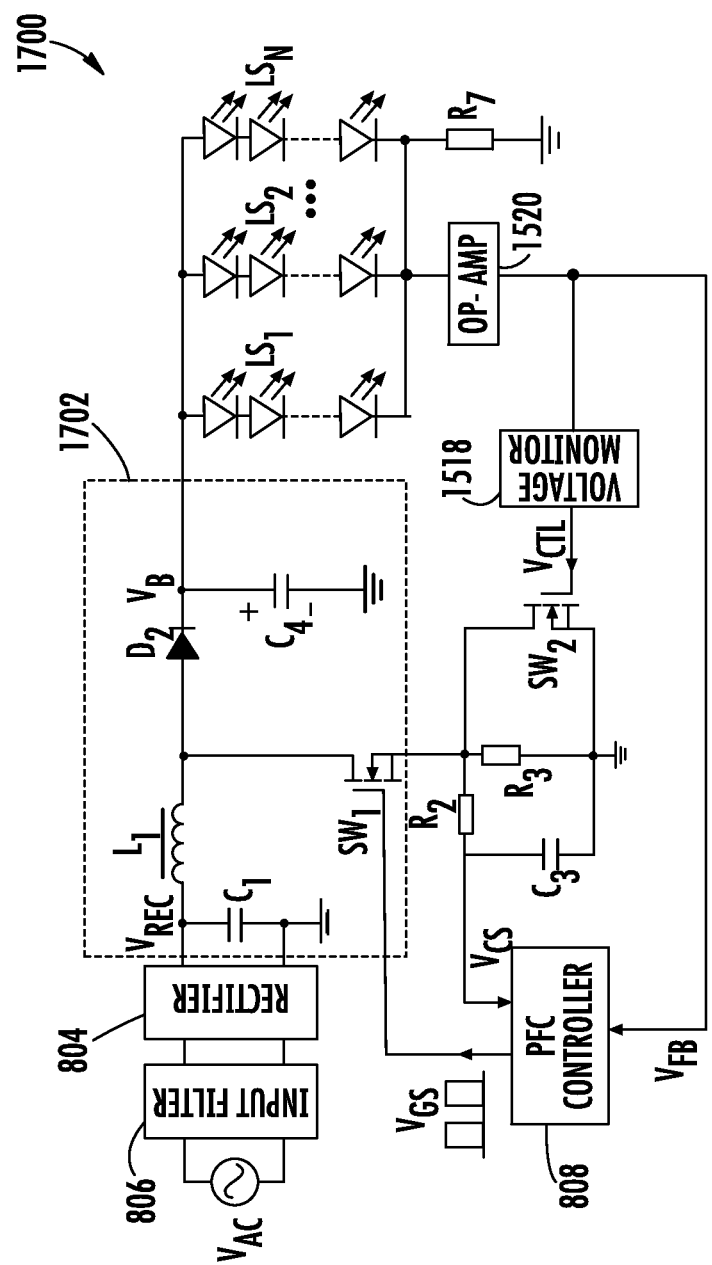
FIG. 17 is a schematic diagram of a driver that includes a speed-up circuit according to example embodiments of the present invention and a boost converter stage.

FIG. 17 shows another implementation of a driver circuit, 1700, with a boost converter 1702 with power factor correction, and the turn-on resistance of the switch $SW_2$ used for speeding up the feedback-loop response of the PFC controller circuit. The boost stage can operate in DCM (discontinuous-conduction-mode) or CCM (continuous-conduction-mode) to achieve power factor correction. Generally DCM mode is used for low power applications (e.g., output power below 300 W) whereas CCM mode is used for high power application (e.g. output power higher than 300 W. The feedback-loop response speed-up circuit can be used for any type of PFC circuit, which has relatively low feedback-loop response to load change.

In FIG. 17, the speed-up circuit includes an output voltage monitor 1518. Op-Amp 1520 amplifies the sensed current signal across current sensing resistor $R_7$, and the voltage monitor samples the output voltage from the Op-Amp and compares it to a given threshold. If the sampled voltage is lower than the given threshold because of a sudden increase of load, a drop of the output voltage is detected, and a control signal $V_{CTL}$ is generated to turn on the switch $SW_2$. As a result, the turn-on resistance of $SW_2$ is paralleled with resistor $R_3$, reducing the effective resistance of the current sensing resistor. The current through the main switch $SW_1$ and inductor $L_1$ will increase and a higher current and power is drawn from the input.

In some of the driver shown herein, bus voltage $V_B$ is generally set by the internal reference $V_{REF}$ of the controller of the converter stage and the external voltage divider comprising resistors $R_4$ and $R_5$. $V_B$ can be expressed by Equation below.

$$V_B = \left(1 + \frac{R_4}{R_5}\right) V_{REF}$$

In order to provide desired driving current for each LED string, a linear or switching current regulator needs an input voltage $V_B$ higher than the maximum voltage of LED strings. Since the LED voltage drop is highly dependent on the operating temperature, driving current, and manufacturing process of the LEDs, it's not uncommon for the LED string voltage to vary by ±10% from its nominal value. To accommodate the wide range of LED string voltage, the output voltage $V_B$ of the pre-regulator is generally set to a value higher than the maximum value for the LED string. In practical applications, the number and types of color of LEDs in the LED strings 1 to N may also be different, which makes the voltage difference between the input voltage $V_B$ and minimum LED string voltage even larger. For a current regulator intended for LED lighting application, a larger difference between the input voltage $V_B$ and LED string voltage generally results in a higher power loss in the current regulator, for example, more power loss of the diode and more switching loss in the switch.

Figure 18:
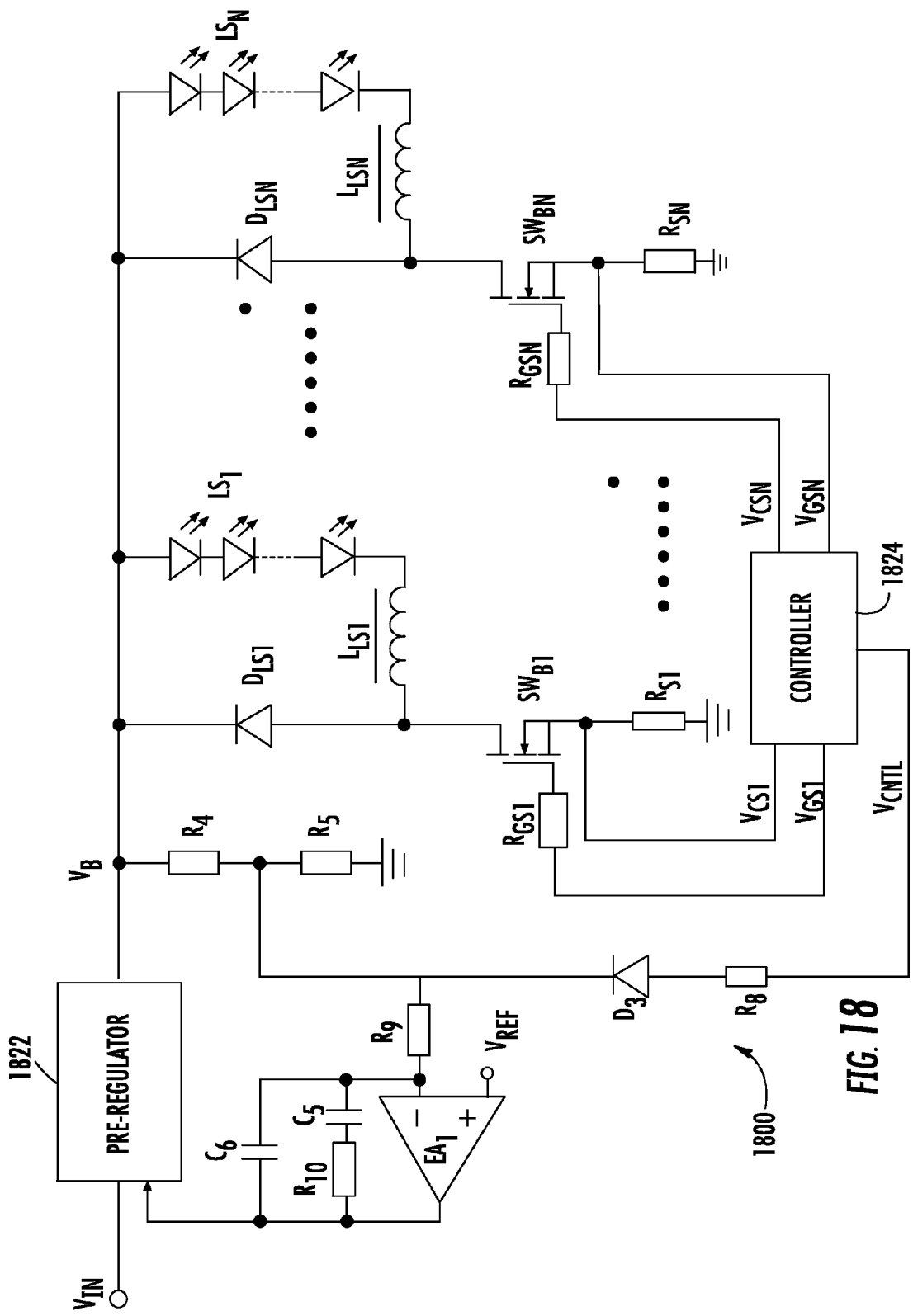
FIG. 18 and FIG. 19 are alternate examples of an overhead control circuit that can be used in a driver according to example embodiments of the present invention.

FIG. 18 shows a driver circuit in which the pre-regulator 1822 adjusts the output voltage $V_B$ adaptively to enable buck-type current regulators to provide desired currents for LED strings $L_{S1}$ to $L_{SN}$. The pre-regulator can be like one of those just discussed or can use a different design. Each buck current regulator comprises a switch ($SW_{B1}$~$SW_{BN}$), a diode ($D_{LS1}$~$D_{LSN}$), an inductor ($L_{LS1}$~$L_{LSN}$), and a current sensing resistor ($R_{S1}$~$R_{SN}$). The overhead controller 1824 can be a micro-controller, an analog controller or a mixed circuit. The overhead controller and supporting circuitry such as the error amplifier $EA_1$ may be referred to herein as an overhead control circuit. A single controller for a lighting system could also perform these functions along with the PFC controller functions and any other control functions needed. Controller 1824 detects the current of each LED string. Based on the sensed current signal, the controller derives the duty cycle of the switches in the buck current regulators. A duty cycle of close to 100% is preferred in order to maximize the efficiency of the buck converter. However, because of the turn-on and turn-off time limitations of the switch, a duty cycle of around 90%, i.e., the turn-on time of the switch accounts for 90% of the switching period, is practically achievable.

In the implementation shown in FIG. 18, the overhead controller generates a control signal $V_{CNTL}$ based on the detected switching duty cycle. If the maximum duty cycle among the buck current regulators is lower than 90%, controller 1824 increases the control signal $V_{CNTL}$ which is injected into the feedback loop of the converter stage output voltage $V_B$ via a diode $D_3$ and a resistor $R_8$ so that the output voltage $V_B$ drops and the duty cycle of the buck converter increases. If the maximum duty cycle among the buck current regulators is higher than 90%, controller 1824 decreases the control signal $V_{CNTL}$ so that the output voltage $V_B$ increases, and the duty cycle of the buck converter decreases. This process continues until the target switching duty cycle, i.e., 90%, is reached. The relationship between the output voltage $V_B$ and injected signal $V_{CNTL}$ can be expressed by the equation below, where $V_{DCNTL}$ is the forward voltage drop of diode $D_3$. Note that the diode is connected to $R_9$, which is in turn connected to the minus side of error amplifier $EA_1$ as well as $C_5$, $R_{10}$, and $C_8$.

$$V_B = \left(1 + \frac{R_4}{R_5} + \frac{R_4}{R_8}\right)V_{REF} - \frac{R_4}{R_8}(V_{CNTL} - V_{D3})$$

If $D_3$ is removed to simplify the design, the above equation becomes:

$$V_B = \left(1 + \frac{R_4}{R_5}\right)V_{REF} - \frac{R_4}{R_8}(V_{CNTL} - V_{REF})$$

Figure 19:
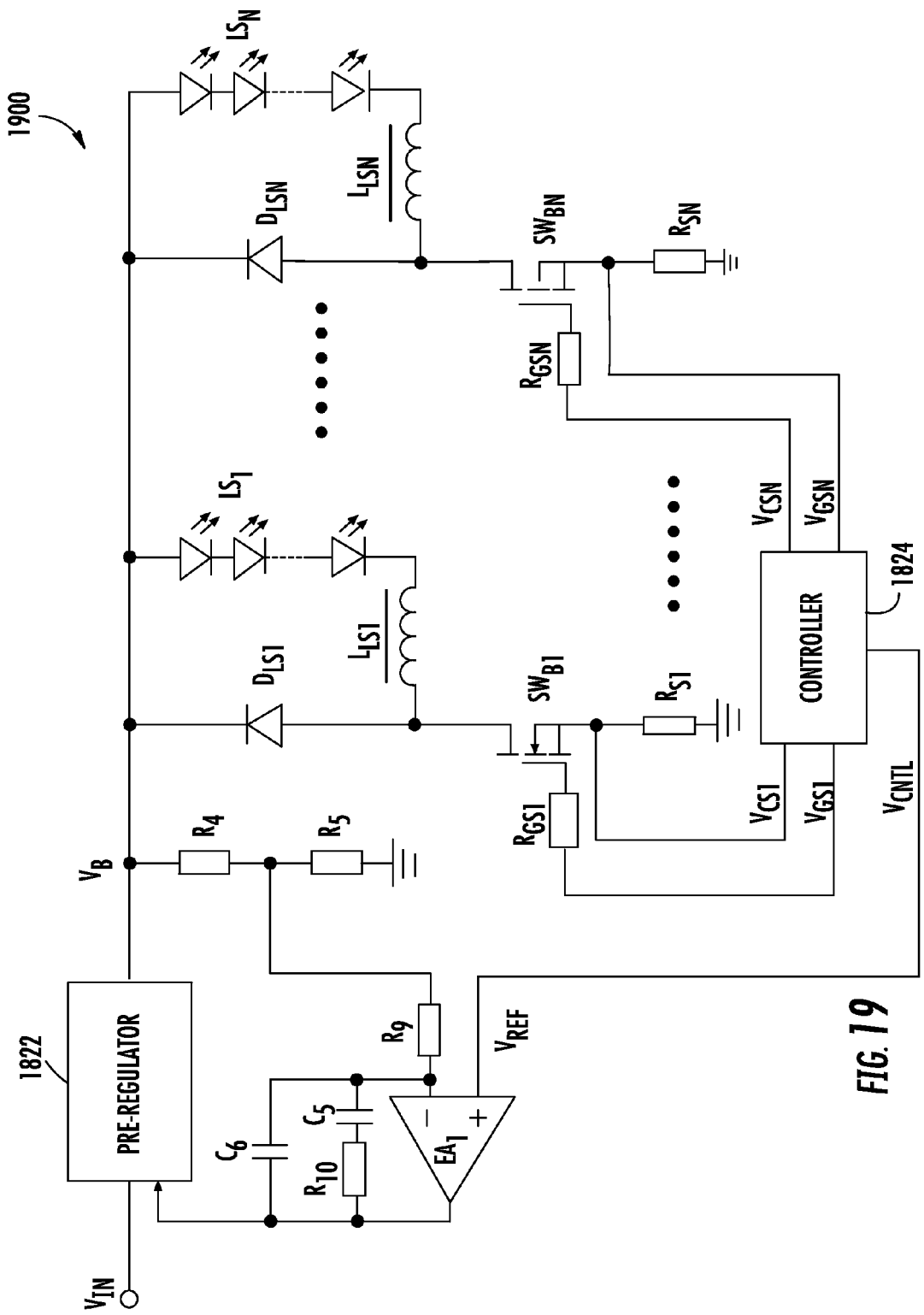

FIG. 19 shows implementation in which the pre-regulator 1822 adjusts the output voltage $V_B$ adaptively to enable the buck-type current regulators of driver 1900 to provide desired currents for LED strings $LS_1$ to $LS_N$ by adjusting the voltage reference $V_{REF}$ at the non-inverting input of the error amplifier EA in the voltage feedback loop. The overhead controller 1824 detects the current in each LED string. Based on the sensed current signal, the controller derives the duty cycle of the switches $SW_{B1}$~$SW_{BN}$. In the implementation shown in FIG. 19, overhead controller 1824 generates a control signal $V_{CNTL}$ based on the detected switching duty cycle as described above. If the maximum duty cycle among the buck current regulators is higher than 90%, the controller increases the control signal $V_{CNTL}$, i.e. in this case, directly increasing the voltage reference $V_{REF}$ of error amplifier $EA_1$ so that the output voltage $V_B$ increases, and the duty cycle of the buck converter decreases. This process continues until the target switching duty cycle, i.e., 90%, is reached. For circuit 1900 of FIG. 19, the relationship between the output voltage $V_B$ and injected signal $V_{CNTL}$ can be expressed by equation below.

$$V_B = \left(1 + \frac{R_4}{R_5}\right)V_{CNTL}$$

Figure 20:
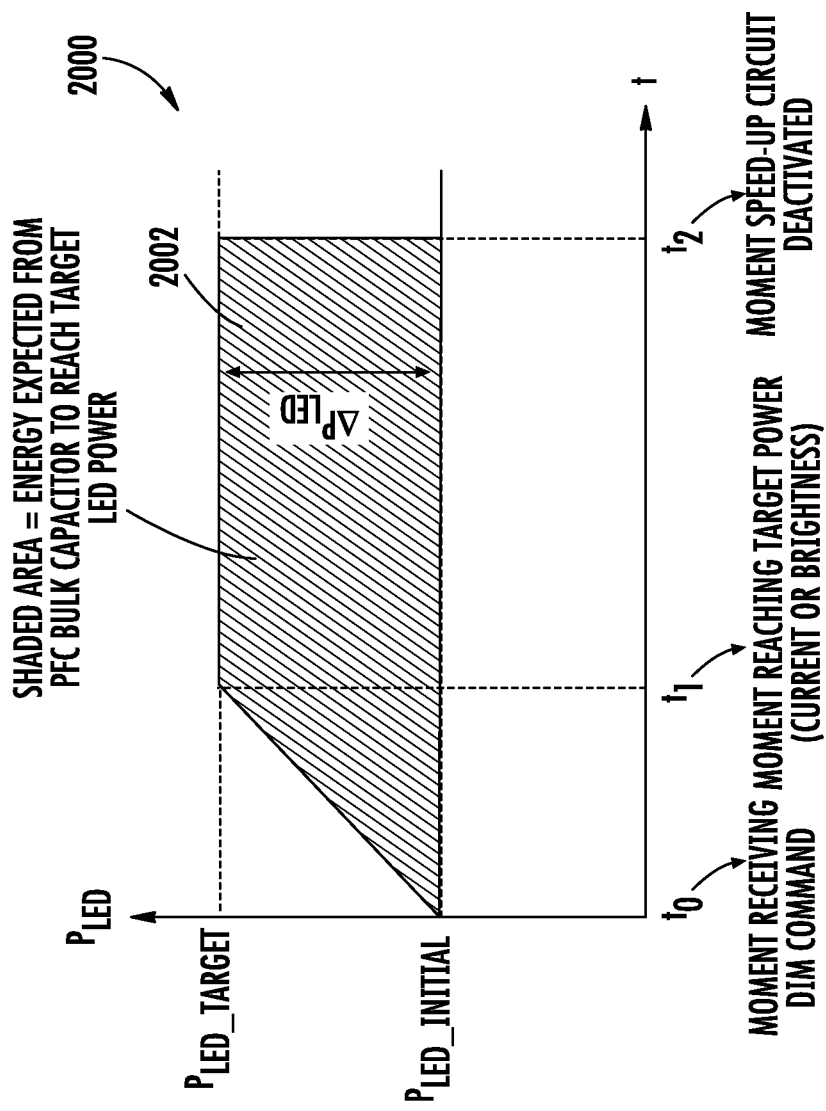
FIG. 20 is an energy diagram for a bulk capacitor according to some embodiments of the invention.

When a dim command is received, the controller will determine if the energy stored in the bulk capacitor, e.g. output capacitor $C_4$ in FIGS. 8-17, is enough to power the LED load before the bus voltage drops to a level close to $V_{LED}$ based on the dim rate and desired target power or current of the LED load. The dim rate is expressed as follows:

$$\text{DIM\_RATE} = \frac{P_{LED\_TARGET} - P_{LED\_INITIAL}}{t_1 - t_0},$$

where $P_{LED\_TARGET}$ is the target power level of the LEDs, $P_{LED\_INITIAL}$ is the initial power of the LEDs before the dimming command is received, $t_0$ is the moment the controller receives the DIM command, and $t_1$ is the moment the target LED power or LED current is supposed to be reached. The speed-up circuit is deactivated at $t_2$. FIG. 20 shows a graph 2000 illustrating the above. The shaded area 2002 shown in FIG. 20 is the energy required from the bulk capacitor $C_4$ to reach the target LED power, which becomes $\Delta P_{LED}$.

Figure 21:
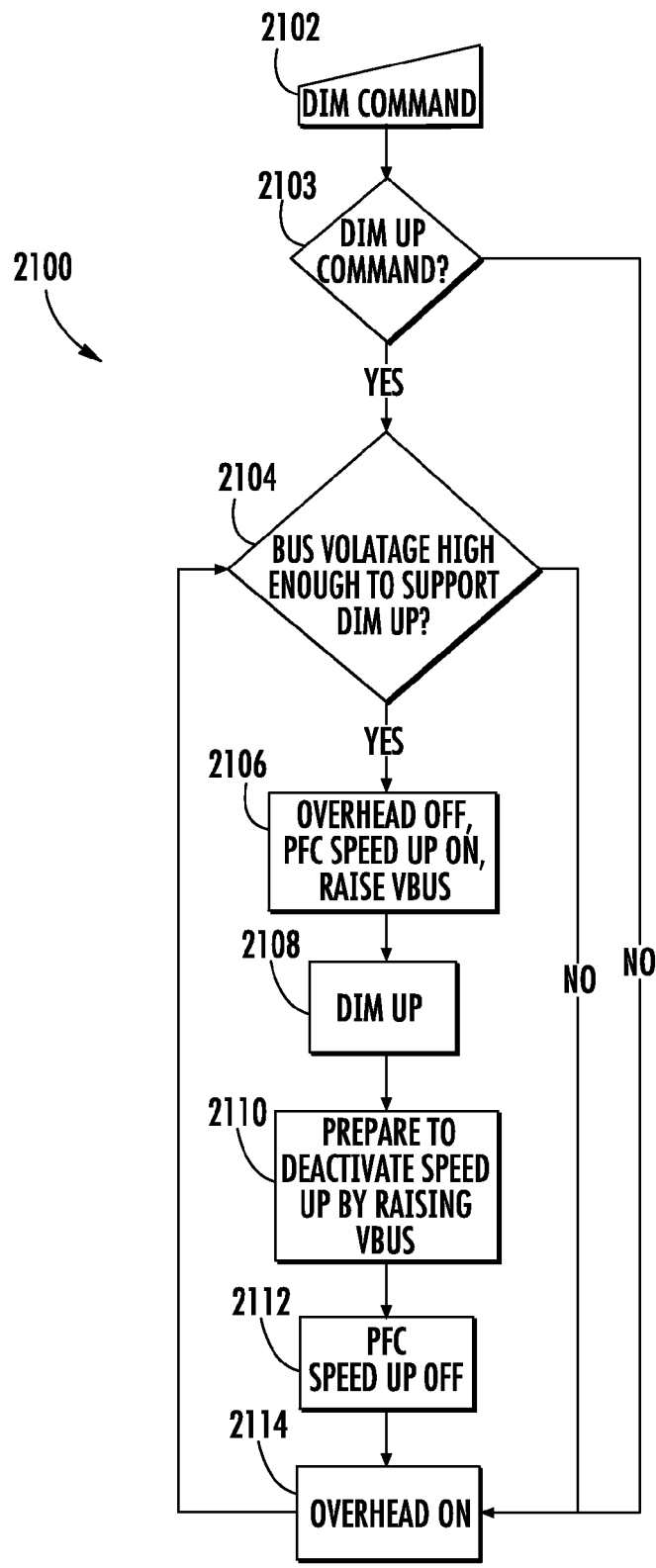
FIG. 21 is a flowchart illustrating the control process for a driver according to example embodiments of the invention.

FIG. 21 is a flowchart illustrating the process of operating the speed-up circuit and the overhead control circuit in a driver according to example embodiments of the invention. Like most flowcharts, FIG. 21 illustrates process 2100 as a series of process or sub-process blocks. In a lighting system, this process is executing by firmware, which includes appropriate computer program code instructions, and which is stored in non-transitory form in memory, which may be inside one or more tangible processors, such as a controller, microcontroller, microprocessor, embedded controller or digital signal processor. The firmware can also be stored in a separate tangible memory device. Process 2100 of FIG. 21 begins when a dim command 2002 is received. The reception of the dim command is determined at block 2103. At decision block 2104, a decision is made as to whether the energy stored in capacitor $C_4$ is enough to increase the LED power to the target value before the voltage across the bulk capacitor $C_4$ decreases to a level close to $V_{LED}$ according to the equation below:

$$\tfrac{1}{2}C_4(V_B^2 - V_{LED}^2) < \tfrac{1}{2}(P_{LED_{TARGET}} - P_{LED_{INITIAL}})(2t_2 - t_1 - t_0),$$

where $t_2$ is the moment the speed-up circuit is deactivated and the overhead control circuit takes control.

If the above condition is true, the overhead control circuit is turned off and the speed-up circuit is turned on at block 2106, raising the bus voltage. The dim signal that comes up at block 2108, and the controller prepares to deactivate the speed-up circuit by raising $V_B$ at block 2110. At block 2112 the speed-up circuit shuts off and at block 2114, the overhead control circuit turns on. How the above process influences the bus voltage will be discussed below with respect to FIG. 22.

Any electronic circuitry connected to a utility source should have good power factor correction (PFC). Input stage PFC controllers work to maintain good PFC according to the accepted standards for power supplies. The idea behind power factor correction is that the closer the utility current follows the utility voltage, the less current is drawn from the line. The PFC controller does this by multiplying the sampled voltage value (through a voltage divider) from the voltage bus after the bridge rectifier. This technique makes the current shape match the input voltage shape generating good power factor correction. The problem is that to do this, the controller cannot respond faster than the input voltage frequency or the current shape no longer matches the voltage shape and good power factor correction cannot be maintained.

Voltage levels generated by the converter stage on the voltage bus are subsequently adjusted by the current regulators in the secondary stage to minimize the use of the inefficient freewheeling diode. This adjustment is performed by lowering the voltage bus level to closely match the forward voltage of the LEDs, which allows the secondary stage buck converters as discussed herein to run at a high duty cycle, minimizing the time the freewheeling diode is conducting current and thus reducing conduction losses.

In a power supply for LEDs, the power factor correction and overhead control causes problems because whenever the light output is increased, the voltage bus voltage can drop below the forward voltage of the LEDs, causing them to start to flicker or in some cases to turn off completely. There are number of ways to solve the problem of bus voltage collapse. A bulk capacitor can be provided with enough capacitance to store enough energy to support the drop. The bus voltage could also be kept a high voltage level so that there is more energy stored in the capacitor. The transient response of the PFC controller could be sped up, or some combination of the above can be used.

For some driver circuits, the capacitor is restricted by size and cost. In this case providing a large capacitance is not appropriate. The other techniques described above should only be used momentarily so that efficiency can be maintained. The bus voltage can be adjusted to a higher level so that enough energy is stored in the capacitor to absorb the change. However, a delay must be inserted to give the converter stage enough time to deliver the energy to the capacitor. Since the PFC controller response is usually slower than 5 Hz, it can take a noticeably long time for the converter stage to store enough energy in the capacitor. The speedup circuit described herein is activated when the bus voltage adjustment is made.

In the microcontroller implementation discussed with respect to FIG. 21, the speedup circuit does not need to be activated every time a slight dimming command is received. A dimming command is received either from a communication link, or in the examples presented herein from a 0 to 10 V dimmer. When a dimming signal is received, the microcontroller receives the signal first and then executes the process illustrated in FIG. 21. The microcontroller then determines whether or not to activate the speedup circuit and increase the bus voltage. This determination is made based on whether the energy represented by the dim command will exceed the energy stored in the capacitor according to the afore-mentioned equation. The overhead controller uses the highest duty cycle of the current regulators for the LED strings to adjust the bus voltage to where the duty cycle meets the highest duty cycle possible. The voltage of an LED string is determined by the product of the bus voltage and the duty cycle.

When the speedup circuit is deactivated, the PFC controller's current sense signal suddenly increases. The converter stage is delivering a smaller amount of current to the output capacitor, which causes a drop in bus voltage. To prevent the voltage from dropping below the LED voltage, the bus voltage can be raised, multiple speedup circuits could be used and deactivated in stages, or a speedup circuit could be slowly deactivated by operating its switch in a linear mode so that the switch acts as a variable resistor. In the examples given herein, the overhead control circuit raises the bus voltage to account for the above discussed drop.

Figure 22:
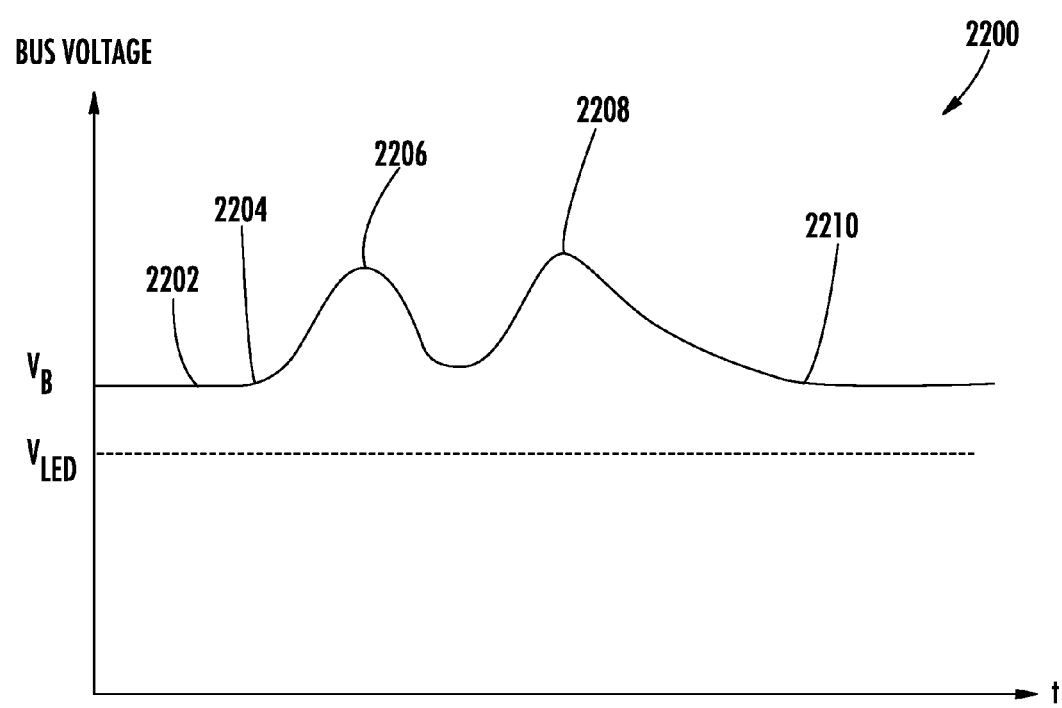
FIG. 22 is a voltage graph illustrating how the bus voltage of a driver circuit changes during operation of example embodiments of the invention.

FIG. 22 is a voltage graph that shows the bus voltage, $V_B$, relative to the LED voltage, the LED. Graph 2200 exhibits several voltage features. At point 2202, a dim up command is received. At point 2204, the overhead controller turns off, and the speedup circuit turns on. At point 2206, the speedup circuit turns off, the voltage dips and then begins to rise. At point 2208 the overhead control circuit turns on, and at point 2210, $V_B$ returns to its original level.

The various portions of a solid-state lamp or lighting system making use of example embodiments of the invention can be made of any of various materials. Heat sinks can be made of metal or plastic, as can the various portions of the housings for the components of a lamp. A system according to embodiments of the invention can be assembled using varied fastening methods and mechanisms for interconnecting the various parts including electronic circuit boards. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A switched-mode driver including an input, and an output connectable to a load, the switched-mode driver comprising:
    a converter stage to receive an input voltage at the input and provide an output voltage to the load at the output, the converter stage further including a switching device;
    a power factor correction controller connected to the switching device to provide a gate signal so that an input current waveform follows an input voltage waveform;
    a speed-up circuit connected to the switching device, the speed-up circuit comprising a control switch with an associated series current sensing resistance to determine current flowing between the switching device and the control switch, and being operable to increase current at the input of the switched-mode driver in response to an increased demand for current by the load; and
    one or more current regulators, each connectable one or more LED strings;
    wherein the one or more current regulators comprise an overhead controller to inject a signal into a feedback loop in the converter stage in response to a duty cycle of the one or more current regulators.

2. The switched-mode driver of claim 1 wherein the speed-up circuit further comprises a voltage monitor connected to the control switch.

3. The switched-mode driver of claim 2 wherein the voltage monitor is implemented by a microcontroller.

4. The switched-mode driver of claim 2 wherein the converter stage further comprises a single-ended primary inductor converter (SEPIC).

5. The switched-mode driver of claim 2 wherein the converter stage further comprises at least one of a buck converter and a boost converter.

6. The switched mode driver of claim 2 wherein the voltage monitor is connected to the output to respond to changes in the output voltage.

7. The switched-mode driver of claim 2 further comprising a current amplifier connectable to the load, wherein the voltage monitor is connected to the current amplifier to respond to the increased demand for current by the load.

8. A switched-mode driver including an output connectable to a load, the switched-mode driver comprising:
    a converter stage to receive an input voltage at an input and provide an output voltage to the load at the output, the converter stage further comprising a feedback loop, the converter stage further including a switching device;
    a power factor correction controller connected to the switching device to provide a gate signal so that an input current waveform follows an input voltage waveform;
    a speed-up circuit connected to the switching device in the converter stage, the speed-up circuit comprising a control switch with an associated series current sensing resistance to determine current flowing between the switching device and the control switch, and being operable to increase current at the input of the switched-mode driver in response to an increased demand by the load; and
    one or more current regulators comprising an overhead control circuit configured to inject a control signal into the feedback loop to adaptively adjust the output voltage in response to changes in operating efficiency of the load.

9. The switched-mode driver of claim 8 wherein each of the one or more current regulators is connectable to one or more parallel LED strings serving as the load.

10. The switched-mode driver of claim 9 wherein the converter stage further comprises a single-ended primary inductor converter (SEPIC).

11. The switched-mode driver of claim 9 wherein the converter stage further comprises at least one of a buck converter and a boost converter.

12. An LED lighting system comprising:
    the switched-mode driver of claim 8;
    one or more parallel LED strings connected to the switched-mode driver as the load; and
    a rectifier connected to the input of the switched-mode driver.

13. An LED lighting system comprising:
    the switched-mode driver of claim 9;
    the one or more parallel LED strings; and
    a rectifier connected to the input of the switched-mode driver.

14. A method of operating an LED lighting system, the method comprising:
    receiving an input voltage and supplying an output voltage to one or more parallel LED strings;
    using a power factor correction controller connected to a switching device to provide a gate signal so that an input current waveform follows an input voltage waveform;
    using a speed-up circuit comprising a control switch with an associated series current sensing resistance to determine current flowing between the switching device and the control switch, to increase current at an input to a converter stage in response to an increased demand for current by the one or more parallel LED strings;
    using a current regulator, the current regulator comprising an overhead controller to adaptively adjust the output voltage in response to changes in the operating efficiency of LEDs in the one or more parallel LED strings.

15. The method of claim 14 wherein the using of the speed-up circuit further comprises sensing the output voltage using a voltage monitor.

* * * * *